US012083075B2

(12) United States Patent
Knobel et al.

(10) Patent No.: US 12,083,075 B2
(45) Date of Patent: Sep. 10, 2024

(54) MODULAR SYSTEM FOR INVENTORY AND TRANSPORT EFFICIENCY OF PACKAGING

(71) Applicant: CR Packaging LLC, Allston, MA (US)

(72) Inventors: Simon Knobel, Vail, CO (US); Ari Markowitz, Allston, MA (US); Alexander Gonzalez, Boston, MA (US); Colin Granger, Atlanta, GA (US)

(73) Assignee: CR Packaging LLC, Allston, MA (US)

( * ) Notice: Subject to any disclaimer, the term of this patent is extended or adjusted under 35 U.S.C. 154(b) by 0 days.

(21) Appl. No.: 18/095,431

(22) Filed: Jan. 10, 2023

(65) Prior Publication Data

US 2023/0233411 A1 Jul. 27, 2023

Related U.S. Application Data

(63) Continuation of application No. 16/457,219, filed on Jun. 28, 2019, now Pat. No. 11,547,634, which is a (Continued)

(51) Int. Cl.

*A61J 7/00* (2006.01)
*A61J 1/03* (2023.01)

(Continued)

(52) U.S. Cl.

CPC ............... *A61J 7/0069* (2013.01); *A61J 1/03* (2013.01); *A61J 1/1425* (2015.05); *A61J 7/0084* (2013.01); *B65D 1/20* (2013.01); *B65D 1/34* (2013.01); *B65D 11/20* (2013.01); *B65D 21/0204* (2013.01); *B65D 21/0213* (2013.01); *B65D 21/0215* (2013.01); *B65D 21/0222* (2013.01);

(Continued)

(58) Field of Classification Search

CPC .......... A61J 7/0069; A61J 1/03; A61J 7/0084; B65D 1/34; B65D 11/20; B65D 21/0213; B65D 21/0215; B65D 21/0222; B65D 21/0223; B65D 21/083; B65D 25/04; B65D 43/0212; B65D 43/169; B65D 50/06

USPC ............ 206/557–567, 1.5, 459.1, 459.5, 499

See application file for complete search history.

(56) References Cited

U.S. PATENT DOCUMENTS 4,516,677 A * 5/1985 Rowland ................ B65D 71/70
108/55.3
D281,836 S * 12/1985 Sparkman ...................... D3/905

(Continued)

*Primary Examiner* — Chun Hoi Cheung
(74) *Attorney, Agent, or Firm* — Fox Rothschild LLP

(57) ABSTRACT

Disclosed herein are modular container systems having child-resistant containers, tray inserts and tray frames. Also disclosed are methods using the modular container systems and methods of storing substances in containers. The containers have a container base and a container cap and provide for child-resistant containers. A user can releasably remove the container cap from container base with a squeeze and lift sequence. For example, the user squeezes opposite sides of the container base, which releases a locking mechanism and allows for removal of the cap by lifting or pulling the container cap off from the container base. The components of the modular container system are modular and stackable. The modular system allow for organized, efficient, accessible and storage of the child-resistant containers. The modular container system also allows for easy counting, sorting and processing of the containers.

19 Claims, 36 Drawing Sheets

Related U.S. Application Data continuation of application No. 15/966,113, filed on Apr. 30, 2018, now Pat. No. 10,376,445.

(60) Provisional application No. 62/492,678, filed on May 1, 2017.

(51) Int. Cl.

| | |
|---|---|
| ***A61J 1/14*** | (2023.01) |
| ***B65D 1/20*** | (2006.01) |
| ***B65D 1/34*** | (2006.01) |
| ***B65D 6/00*** | (2006.01) |
| ***B65D 21/02*** | (2006.01) |
| ***B65D 21/08*** | (2006.01) |
| ***B65D 25/04*** | (2006.01) |
| ***B65D 43/02*** | (2006.01) |
| ***B65D 43/16*** | (2006.01) |
| ***B65D 50/06*** | (2006.01) |
| ***B65D 71/70*** | (2006.01) |
| ***B65D 83/04*** | (2006.01) |

(52) U.S. Cl.

CPC ..... *B65D 21/0223* (2013.01); *B65D 21/0233* (2013.01); *B65D 21/083* (2013.01); *B65D 25/04* (2013.01); *B65D 43/0212* (2013.01); *B65D 43/169* (2013.01); *B65D 50/06* (2013.01); *B65D 50/066* (2013.01); *B65D 71/70* (2013.01); *B65D 83/0445* (2013.01); *B65D 2203/12* (2013.01); *B65D 2215/04* (2013.01); *B65D 2251/01* (2013.01); *B65D 2251/04* (2013.01); *B65D 2543/00203* (2013.01); *B65D 2543/00296* (2013.01); *B65D 2543/00351* (2013.01); *B65D 2543/00648* (2013.01); *B65D 2543/00694* (2013.01); *B65D 2543/00759* (2013.01); *B65D 2543/00805* (2013.01); *B65D 2585/56* (2013.01)

(56) References Cited

U.S. PATENT DOCUMENTS

| | | | | | |
|---|---|---|---|---|---|
| 4,749,085 | A * | 6/1988 | Denney | A61J 7/0069 | 206/534 |
| 5,344,024 | A * | 9/1994 | Cohu | B07C 7/04 | 209/706 |
| 5,366,069 | A * | 11/1994 | Seidner | A45C 1/10 | 206/499 |
| 5,605,230 | A * | 2/1997 | Marino, Jr. | B65D 55/026 | 40/310 |
| 6,464,506 | B1 * | 10/2002 | Welles | G09B 19/00 | 434/238 |
| 6,595,365 | B1 * | 7/2003 | Wigmore | A61J 1/03 | 206/204 |
| D547,052 | S * | 7/2007 | Cooper | D3/203.3 | |
| 7,353,939 | B2 * | 4/2008 | Coe | A61J 1/03 | 206/534 |
| D626,866 | S * | 11/2010 | Powers | D10/40 | |
| 9,010,255 | B2 * | 4/2015 | Baltz | B65D 19/0004 | 108/57.13 |
| 2004/0159576 | A1 * | 8/2004 | Holmberg | A61J 7/04 | 206/538 |
| 2006/0086641 | A1 * | 4/2006 | Priebe | B65D 83/04 | 206/538 |
| 2006/0254950 | A1 * | 11/2006 | Barlog | A61J 1/03 | 206/428 |
| 2007/0295635 | A1 * | 12/2007 | Rivero | G09F 3/20 | 206/538 |
| 2007/0295636 | A1 * | 12/2007 | Rivero | G09F 3/0288 | 206/538 |
| 2009/0236258 | A1 * | 9/2009 | Connell | B29C 45/16 | 53/467 |
| 2009/0301985 | A1 * | 12/2009 | Priebe | B65D 50/046 | 215/211 |
| 2013/0140202 | A1 * | 6/2013 | Benoit | B65D 25/04 | 206/278 |
| 2015/0232235 | A1 * | 8/2015 | Lloyd | B65D 50/00 | 220/304 |

* cited by examiner

MODULAR SYSTEM FOR INVENTORY AND TRANSPORT EFFICIENCY OF PACKAGING

CROSS-REFERENCES TO RELATED APPLICATIONS

This Application is a Continuation of application Ser. No. 16/457,219 filed on Jun. 28, 2019. Application Ser. No. 16/457,219 is a Continuation of application Ser. No. 15/966,113 filed on Apr. 30, 2018. Application Ser. No. 15/966,113 claims the benefit of Provisional Application No. 62/492,678 filed May 1, 2017, the entire contents of each of which are incorporated herein by reference.

FIELD OF INVENTION

The present disclosure relates to a modular container system for storage and inventory systems, comprising the child-resistant containers and methods for using the containers.

BACKGROUND

Containers intended for storing substances or materials which may be harmful to children are designed to prevent opening by a child and yet can be manipulated by adults, including seniors, to gain access to the substance. These "child-resistant" containers are typically used for over the counter and prescription medications. Other child-resistant containers are used for other household items, that are toxic if swallowed or ingested, such as laundry detergent, cleaners, These systems are in place to prevent children from inadvertently gaining access to the contents of these containers.

Generally, child resistant containers include a multi-step opening process or require steps to be completed simultaneously. A certain level of mental and physical dexterity is required for opening such a container, making it difficult for children to access the contents within. For example, use of a certain amount of pressure or force while a second action is completed is needed to open such a container, which prevents children from being able to open and access the contents of the container.

A challenge in creating child resistant containers is making the container easy enough for the elderly and other individuals to be able to use. For example, some child resistant containers offer a screw-cap or pop-top closure, and although they are efficient for child resistance, these devices pose a degree of hardship for individuals with wrist and finger joint inflammation or arthritis.

Currently available child resistant containers are also often inadequate in protecting the contents from degradation upon exposure to environmental factors such as moisture, temperature, bacteria or air.

Also, most screw cap medicine containers lack external features favorable for counting, sorting, stacking and efficient inventory management.

Therefore, there remains a need for improved containers and systems that are easy to use for an elderly or disabled individual, while providing child-resistant features. Also, there remains a need for a container where the contents are protected for improved shelf-life, such as being liquid-tight, air-tight, or both. Finally there remains a need for containers that can be adapted for efficient stacking and can be part of a larger storage and inventory system. Such features allow for the containers to be used in the automation in packaging and distribution centers. The container is part of a storage system that allows easy storage, inventory, inventory reconciliation, and distribution in bulk quantities.

SUMMARY OF THE INVENTION

The present invention relates to a modular container system. The modular container system generally has a tray frame, a tray insert and a container. Parts of the modular container system, as well as the system itself, is modular, including stackable components that are able to stack on each other, or combination of components that are stackable. The modular container system can be used as an inventory system.

The containers described herein can be part of the modular container system. Embodiments of the containers are configured to be child-resistant. The disclosed containers provide an improved packaging and storage of substances or materials in a controlled environment, providing, for example, an air-tight, liquid-tight, water-tight, humidity-controlled, light-controlled, or any combination thereof environment.

Accordingly, in one aspect, the present invention is directed to a modular container system. The modular container system comprises a tray frame, a tray insert, and one or more child-resistant containers. The tray frame is sized and configured to receive the tray insert. The one or more child-resistant containers comprises a container base and a container cap. In some embodiments, the container cap can further comprise an annular sealing ring positioned on an inner surface of the container cap.

In some embodiments, the tray insert is sized and configured to receive the one or more child-resistant containers. The tray insert also comprises a plurality of recessed portions, wherein each recessed portion is configured to receive a single child-resistant container. Each recessed portion comprises an identifying mark. For example, the identifying mark is a number. The plurality of recessed portions are sequentially numbered, labeled or marked.

In some embodiments, the tray insert has 1, 2, 4, 9, 16, 20, 25, 36, 42, 64, 81 or 100 recessed portions, in a, for example, 1×1, 2×2, 3×3, 4×4, 5×5, 6×6, 7×7, 8×8, 9×9 or 10×10 configuration.

In some embodiments, the tray insert comprises a first locking mechanism disposed on a first side of the tray insert and a second locking mechanism disposed on a second side of the tray insert. The first and the second locking mechanism comprises a male connector and a female connector, so that the tray insert is configured to reversibly connect with a second tray insert.

In some embodiments, the tray insert is configured to nest on top of another tray insert. The tray insert is also configured to be stacked on top of another tray insert having a container in substantially all of the recessed portions.

In some embodiments, the tray insert is a plastic, recycled material, or other suitable material. For example, the plastic is polypropylene, fluorinated ethylene propylene, acrylonitrile butadiene styrene, polystyrene, high-impact polystyrene, or polyvinyl chloride.

Other materials or additives can be added to the tray insert. For example, the tray insert further comprises an antimicrobial additive.

In some embodiments, the tray frame is made from cardboard, plastic, glass, recycled material or a combination thereof.

In some embodiments, the modular container system can comprising a tamper evident element. For example, the tamper evident element is a seal, a tape, or a combination thereof. Also, the modular container system can comprise an RFID tag.

In some embodiments, each of the tray frame, the tray insert, the one or more child-resistant containers, or a combination thereof can comprise a writing surface compatible with a pen, a pencil, or a marker.

In some embodiments, the child-resistant container comprises a container base and a container cap.

In some embodiments, the container base comprises a closed bottom end, an open top end, a radially-extending flange disposed on an outer surface of the container base, a first cap engagement element, and a second cap engagement element; wherein the first and second cap engagement elements are disposed on the outer surface of the container base, opposite each other, and between the open top end and the flange.

In some embodiments, the first and second cap engagement elements of the container base each comprise a raised surface to receive and engage with the base engagement element, a plurality of ridges disposed between the raised surface and the flange and at least one groove between the plurality of ridges In some embodiments, the raised surface is substantially parallel to the flange. In some embodiments, the at least one groove is configured to receive a ridge from the lower row of ridges.

In some embodiments, the container base further comprises one or more anti-rotation locks symmetrically disposed on the outer surface radially between the first cap engagement element and the second cap engagement element.

In some embodiments, the container base further comprises an insert defining two or more compartments within the container base.

In some embodiments, the container cap comprises one or more base engagement elements on an interior surface of the container cap, wherein each of the one or more base engagement elements are configured to engage and reversibly couple to the first and second cap engagement elements of the container base.

Each of the one or more the base engagement elements of the container cap comprises an upper row of ridges and a lower row of ridges, and wherein the upper row and the lower row of ridges are configured to engage with the radially-extending flange, the first cap engagement element, the second cap engagement element, or a combination thereof.

In some embodiments, container cap comprises 1, 2, 3, or 4 base engagement elements.

In some embodiments, the engagement of the container base with the container cap enables the one or more base engagement elements to lockably secure with the first and second cap engagement elements to substantially provide a child resistant container when in a closed configuration.

In some embodiments, the child-resistant container also comprises a grip marking disposed on the outer surface just below the radial flange on the same side of the cap engagement elements of the container base.

In some embodiments, the container cap further comprises an elevated portion at a top end of the cap; and wherein the container base further comprises a receiving portion defined by a recessed floor of the base; wherein the elevated portion of the cap is adapted to engage the receiving portion of the container base so the child-resistant container can stack on another child-resistant container.

In some embodiments, the receiving portion of the container base comprises a plurality of stacking elements disposed along an outer edge of the receiving portion.

In some embodiments, the container base, the container cap or both comprise a polymer. For example, the polymer comprises polypropylene, polypropylene copolymer, ultra-clarified polypropylene, colored polypropylene, PET, PETE, polycarbonate, polystyrene, or a combination thereof.

In some embodiments, the container cap further comprises an annular sealing ring positioned on an inner surface of the top end of the cap. In some embodiments, the child-resistant container is substantially air-tight, liquid-tight, light resistant, temperature resistant, moisture resistant, bacterial resistant, tamper resistant, or a combination thereof.

Another aspect of the present invention includes a method of affecting a child-resistant closure of a container. The method comprises providing a child-resistant container comprising a container base and a container cap and sliding the container cap over the open end of the container base, wherein the first and second cap engagement elements engage with and couple to the one or more base engagement elements.

In some embodiments, the container base comprises a closed bottom end, an open top end, a radially-extending flange disposed on an outer surface of the container base, a first cap engagement element, and a second cap engagement element.

In some embodiments, the first and second cap engagement elements are disposed on the outer surface of the container base, opposite each other, and between the open top end and the flange.

In some embodiments, the container cap comprises one or more base engagement elements on an interior surface of the cap, each of the one or more base engagement elements are configured to engage and reversibly couple to the at least one cap engagement element of the base.

In some embodiments, each of the one or more base engagement elements of the container cap comprises an upper row of ridges and a lower row of ridges, and wherein the upper row and the lower row of ridges are configured to engage with the radially-extending flange, the first cap engagement element, the second cap engagement element, or a combination thereof.

In some embodiments, the first and second cap engagement elements of the container base each comprise a raised surface to receive and engage with the base engagement element, a plurality of ridges disposed between the raised surface and the flange, and at least one groove between the plurality of ridges, wherein the at least one groove is configured to receive a ridge from the lower row of ridges.

In some embodiments, the raised surface is substantially parallel to the flange.

In some embodiments, sliding the container cap over the open end of the container base enables the lower row of ridges to slide over and couple with the raised surface of the cap engagement element. In some embodiments, a ridge from the lower row of ridges is received within the at least one groove on the container base.

In some embodiments, the method of affecting a child-resistant closure of a container further comprises removing the container cap by simultaneously applying about 2 to about 6 pounds of external compression force to opposite sides of the container base and pulling the container cap off of the container base.

Additional aspects of the invention will be set forth in part in the description which follows. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

Features and advantages of the claimed subject matter will be apparent from the following description of embodiments consistent herewith, which the description should be considered in conjunction with the accompanying drawings.

FIG. 13A illustrates an exploded view of the container base and container cap; FIG. 13B illustrates the child-resistant container having a container base and a container cap in a closed configuration; FIGS. 13C and 13D illustrate side views of the child-resistant container having a container base and a container cap in a closed configuration; FIG. 13E illustrates a bottom view of a container base; FIG. 13F illustrates a top view of a container base.

FIG. 15A illustrates a perspective view of an embodiment of a container cap. FIG. 15B illustrates a bottom view of an embodiment of a container cap. FIG. 15C illustrates a top view of an embodiment of a container cap.

FIG. 16A is a perspective view of two child-resistant containers stacked on each other; FIG. 16B is a side view of the two child-resistant containers stacked on each other.

FIG. 34A is a perspective view of the stacked modular container system; FIG. 34B is a side view of the stacked modular container system; FIG. 34C is another side view of the stacked modular container system; FIG. 34D is a cross-sectional view of the stacked modular container system.

DETAILED DESCRIPTION OF THE INVENTION

Figure 1:
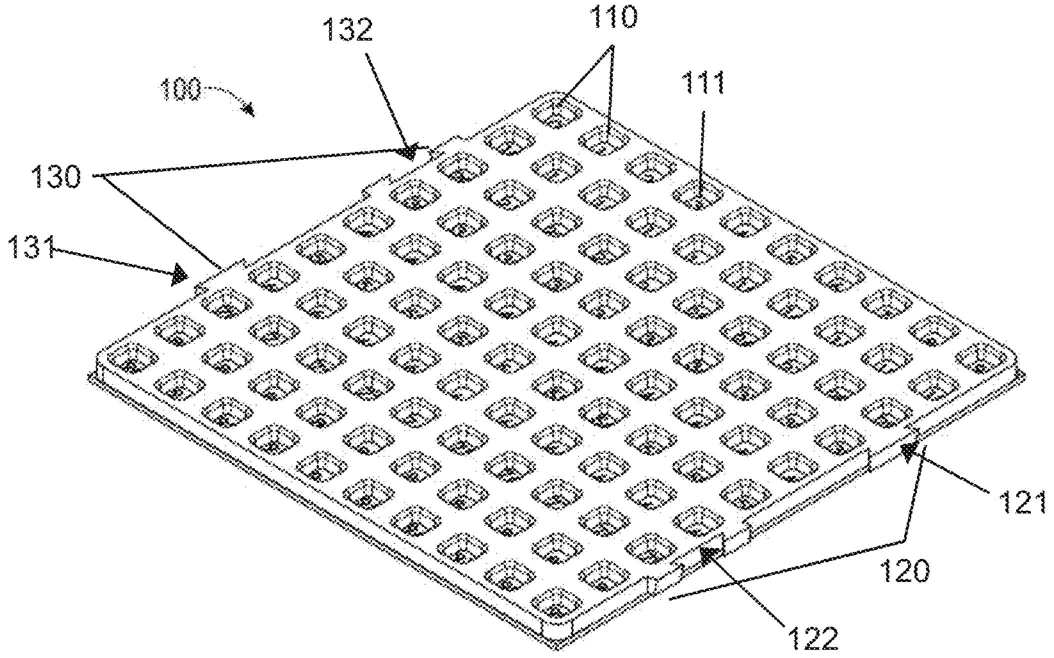
FIG. 1 illustrates a perspective view of an embodiment of a tray insert for a tube container.

The present invention relates to modular container systems including tray frames, tray inserts, and/or child-resistant containers. Aspects of present disclosure also include storage systems and inventory systems. Other aspects include methods for using the child-resistant containers (e.g., for creating child-resistance and for storing or holding a material). The modular container systems can be understood more readily by reference to the following detailed description of the invention. It will be apparent to those skilled in the art that various modifications can be made without departing from the scope of the invention.

As used in the specification and the appended claims, the singular forms "a," "an" and "the" include plural referents unless the context clearly dictates otherwise. Thus, for example, reference to "an element" includes two or more elements.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

It is understood that the modular container systems, materials and devices disclosed herein have certain functions. Disclosed herein are certain structural requirements for performing the disclosed functions, and it is understood that there are a variety of structures that can perform the same function that are related to the disclosed structures, and that these structures will typically achieve the same result.

Modular Container Systems

The modular container systems described herein generally have a tray frame, a tray insert and a container. Parts or components of the modular container system, as well as the system itself, is modular. The components are stackable—they are able to stack on each other or in combination with other components of the system. The modular container system can be used as an inventory system.

The containers described herein can be part of the modular container system. Embodiments of the containers are configured to be child-resistant. The disclosed containers provide an improved packaging and storage of substances or materials in a controlled environment, providing, for example, an air-tight, liquid-tight, water-tight, humidity-controlled, light-controlled, or any combination thereof environment.

Tray Inserts

In some aspects of the present disclosure, the modular container systems comprise a tray insert. Referring to FIGS. 1-10, a tray insert is sized and configured to fit within a tray frame (described in detail below). Also, the tray insert is configured to specifically house an embodiment of a child-resistant container (described in detail below). It is also contemplated that a tray insert can house more than one type (e.g., size) of child-resistant container. As described herein, the tray inserts can have any number of recessed portions (i.e., the number of child-resistant containers it can hold). For example, the tray insert has 1, 2, 4, 9, 16, 20, 25, 36, 42, 64, 81 or 100 recessed portions, in, for example, a 1×1, 2×2, 3×3, 4×4, 5×5, 6×6, 7×7, 8×8, 9×9 or 10×10 configuration.

Referring to FIG. 1, tray insert 100 has a plurality of recessed portions 110. Each recessed portion 110 can comprise an identifying mark 111 to easily aid in the inventory methods described herein. For example, the identifying mark 111 can be a letter, number, or other symbol. Tray insert 100 also has a first locking mechanism 120 and a second locking mechanism 130. Each locking mechanism 120, 130 has a male 121, 131 and a female 122, 132 connector. The locking mechanism 120, 130 is disposed on a side of the tray insert 100 and allows for mating to another tray insert 100 (or, e.g., tray insert 200, 300, 400 or 500). The locking mechanisms 120, 130 are disposed in such a way so that the tray inserts must be oriented in such a position in order to mate with another tray insert. Tray insert 100 is in a 10×10 configuration with 100 recessed portions 110, sized to house an embodiment of a tube container (described in detail below).

Figure 2:
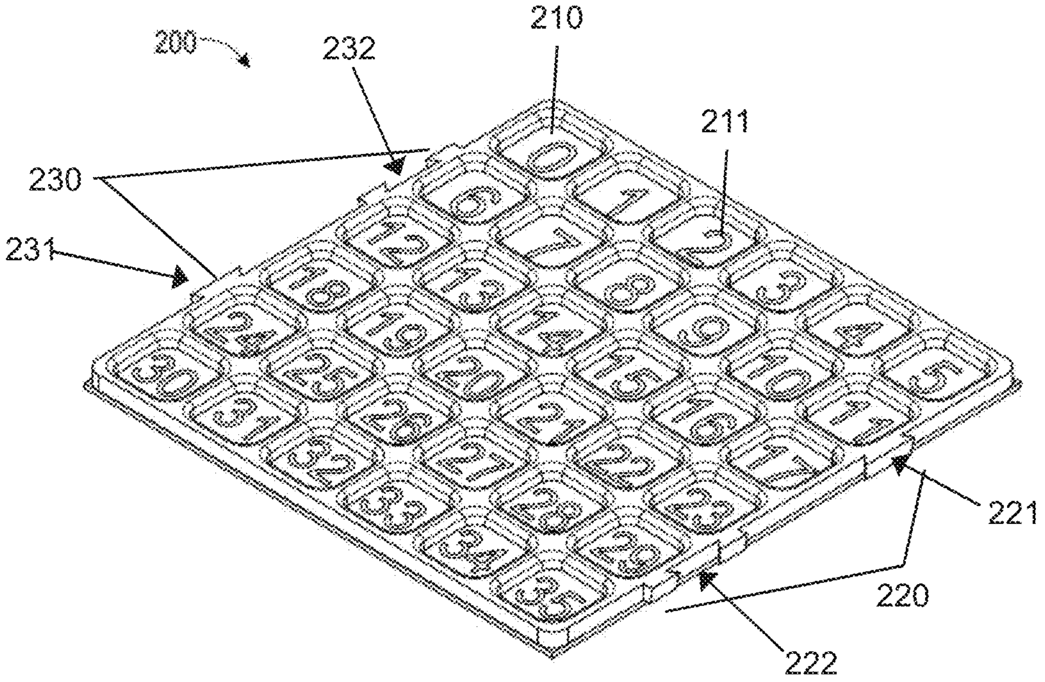
FIG. 2 illustrates a perspective view of an embodiment of a tray insert for a 15D container.

Similarly, tray insert 200 of FIG. 2 has a plurality of recessed portions 210, each with an identifying mark 211. The identifying mark 211 is a number shown on the bottom of each recessed portion 210. Locking mechanisms 220, 230 are disposed on opposite sides of the tray insert 200 and allow for mating to another tray insert 100, 200, 300, 400, or 500 (FIGS. 1-5). Although male-female 221, 222; 231, 232 type connectors are shown, other locking and connecting means can be used. Tray insert 200 is in a 6×6 configuration, having 36 recessed portions 210. Each recessed portion 210 is sized and configured to house an embodiment of a child-resistant container (e.g., a 15D container).

Figure 3:
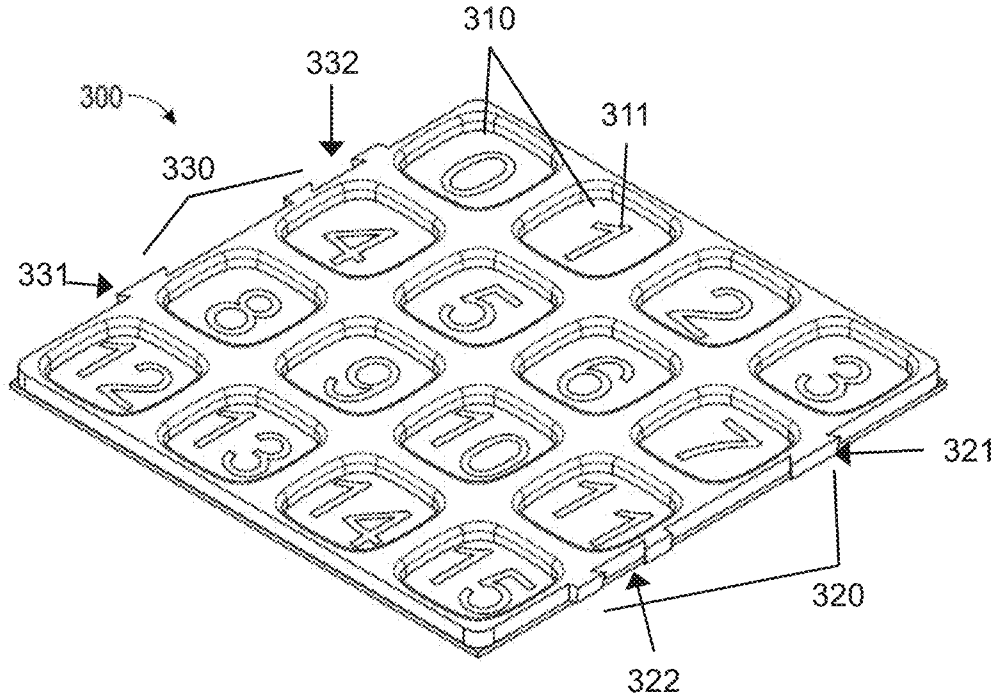
FIG. 3 illustrates a perspective view of an embodiment of a tray insert for a 45D container.
Figure 4:
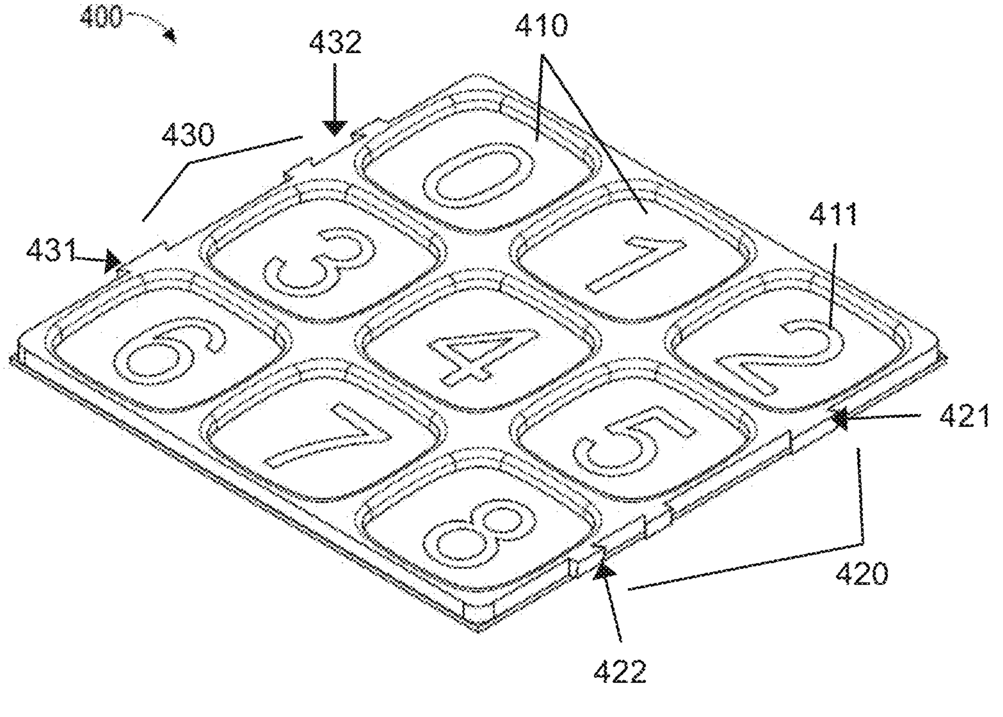
FIG. 4 illustrates a perspective view of an embodiment of a tray insert for a 145D container.

Tray insert 300 of FIG. 3 has a 4×4 configuration, sized to house another embodiment of a child resistant container (e.g., a 45D container). Tray insert 400 of FIG. 4 has a 3×3 configuration, sized to house yet another embodiment of a child-resistant container (e.g., a 145D container). Tray insert 500 of FIG. 5 has a 5×5 configuration, sized to house another embodiment of a child-resistant container (e.g., a 25D container). FIGS. 1-5 show various embodiments of tray inserts configured for various embodiments of child-resistant containers and tube containers. However, it is also contemplated that other configurations are possible, including more than one type of child-resistant container for a single tray insert.

The tray inserts of FIGS. 1-5 all have universal locking mechanisms that allow for mating between any of the tray inserts, regardless of the size of the recessed portions. As such, the tray inserts are substantially similar to or equal in length and/or width to allow for such mating.

Figure 5:
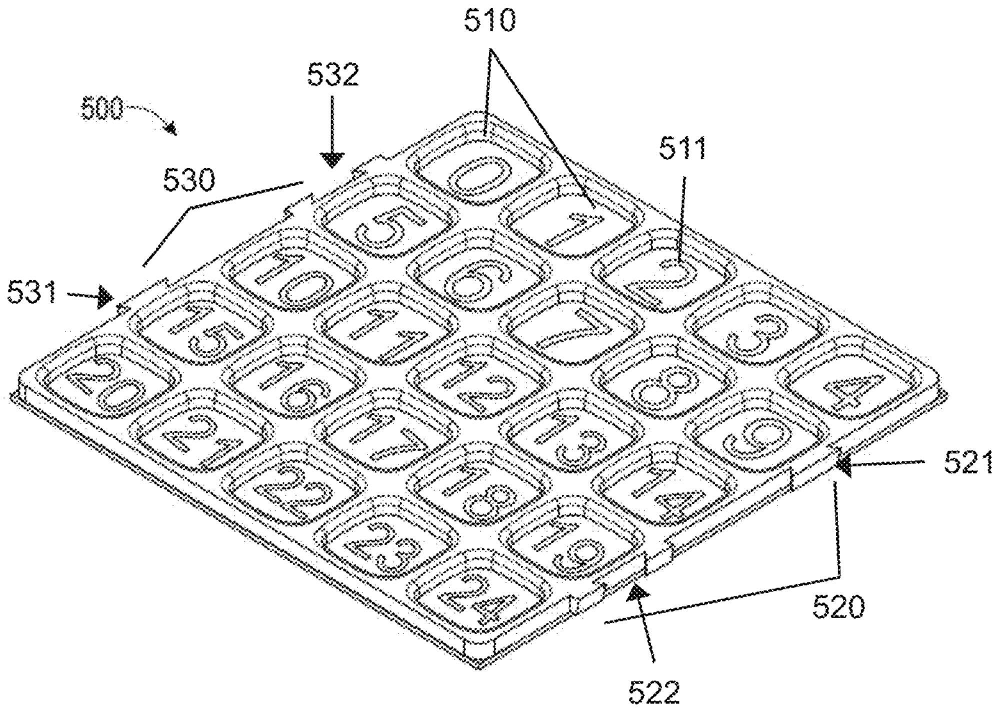
FIG. 5 illustrates a perspective view of an embodiment of a tray insert for a 25D container.
Figure 6:
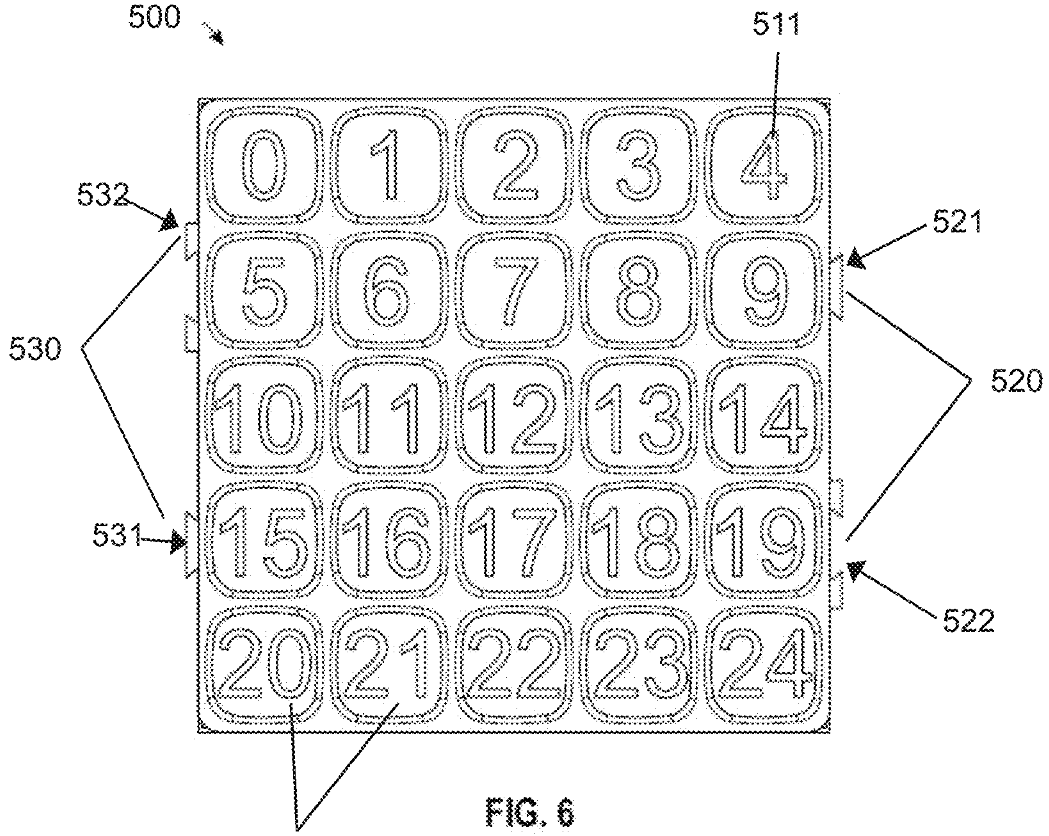
FIG. 6 illustrates a top view of the embodiment of the 25D tray insert of FIG. 5.
Figure 7:
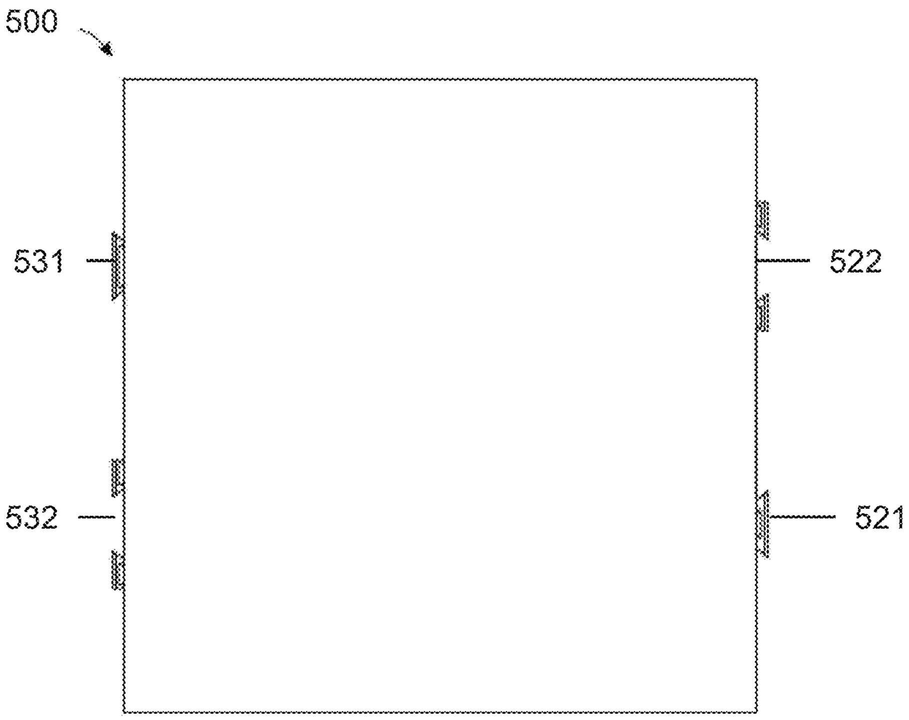
FIG. 7 illustrates a bottom view of the embodiment of the 25D tray insert of FIG. 5
Figure 8:
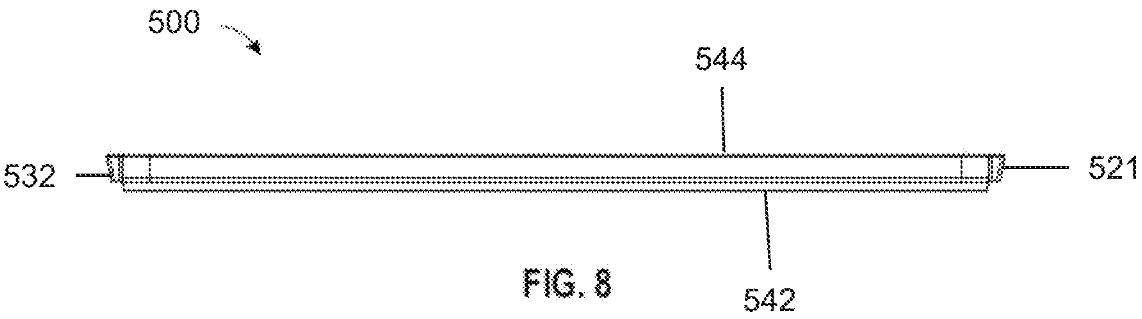
FIG. 8 illustrates a front view of the embodiment of the 25D tray insert of FIG. 5.
Figure 9:
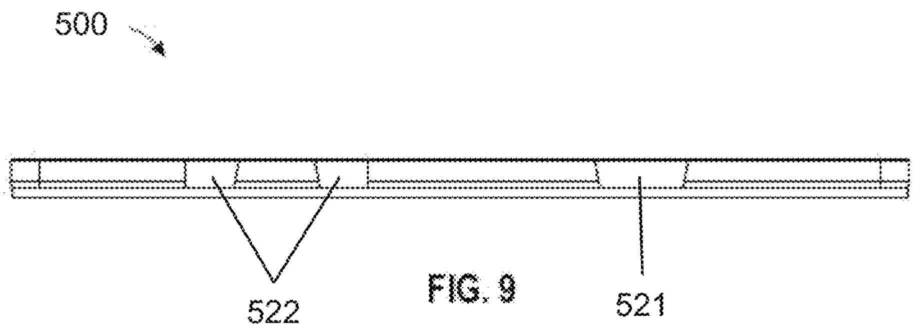
FIG. 9 illustrates a side view of the embodiment of the 25D tray insert of FIG. 5.

FIGS. 6-9 illustrate other views of tray insert 500, as shown in FIG. 5. Identifying marks 511 are illustrated in each recessed portion 510. The identifying marks 511 are numbers in sequential order starting at the number 0, starting from the top left and moving from left to right and from top to bottom, ending in number 24. Thus, tray insert 500 has 25 recessed portions. When tray insert 500 is completely filled with child-resistant containers, each of the identifying marks are covered by each container. Once containers are removed from the tray insert, the identifying mark 511 becomes visible. Containers removed in reverse order (i.e., starting from the bottom right and moving from right to left and bottom to top), easily allows for quantifying the number of remaining containers. For example, if a single container is removed from tray insert 500 from the bottom right position, the identifying mark 511 “24” is revealed and tells a person that 24 containers remain in tray insert 500.

Tray insert 500 has a top portion 544 and a bottom portion 542, having a depth. The depth of each recessed portion 510 is no greater than the depth of the tray insert 500.

Figure 10:
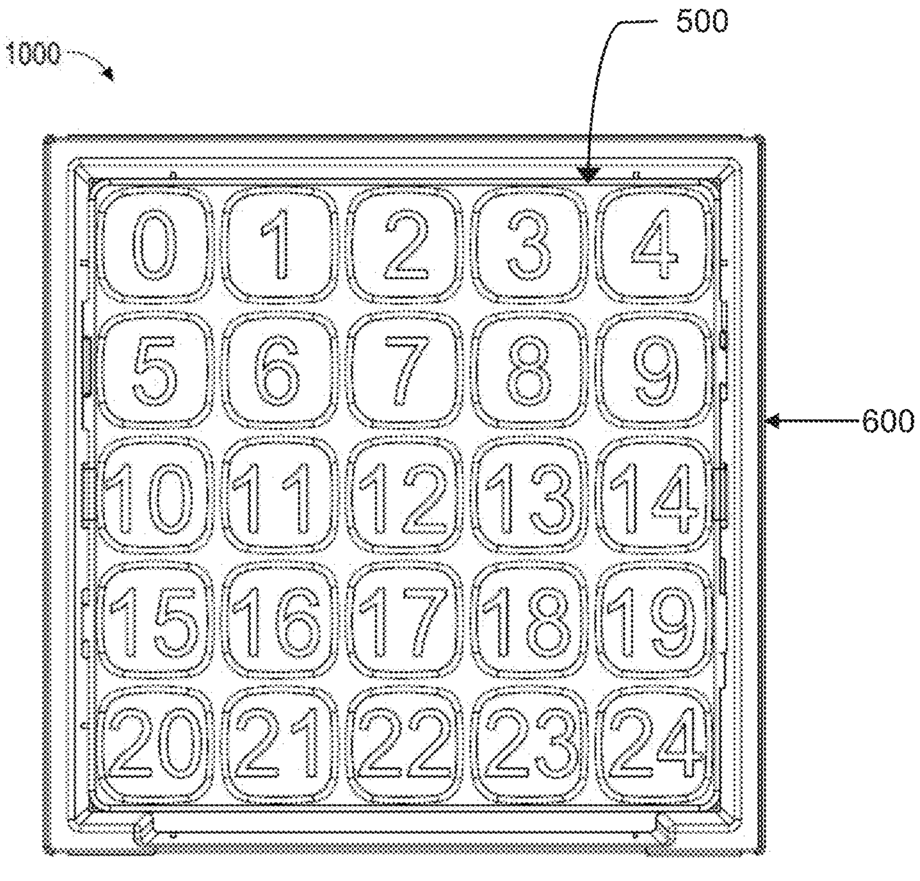
FIG. 10 illustrates a top view of the embodiment of the 25D tray insert of FIG. 5 in an embodiment of a tray frame.
Figures 11, 11A, 11B, 11C, 11D, 11E:
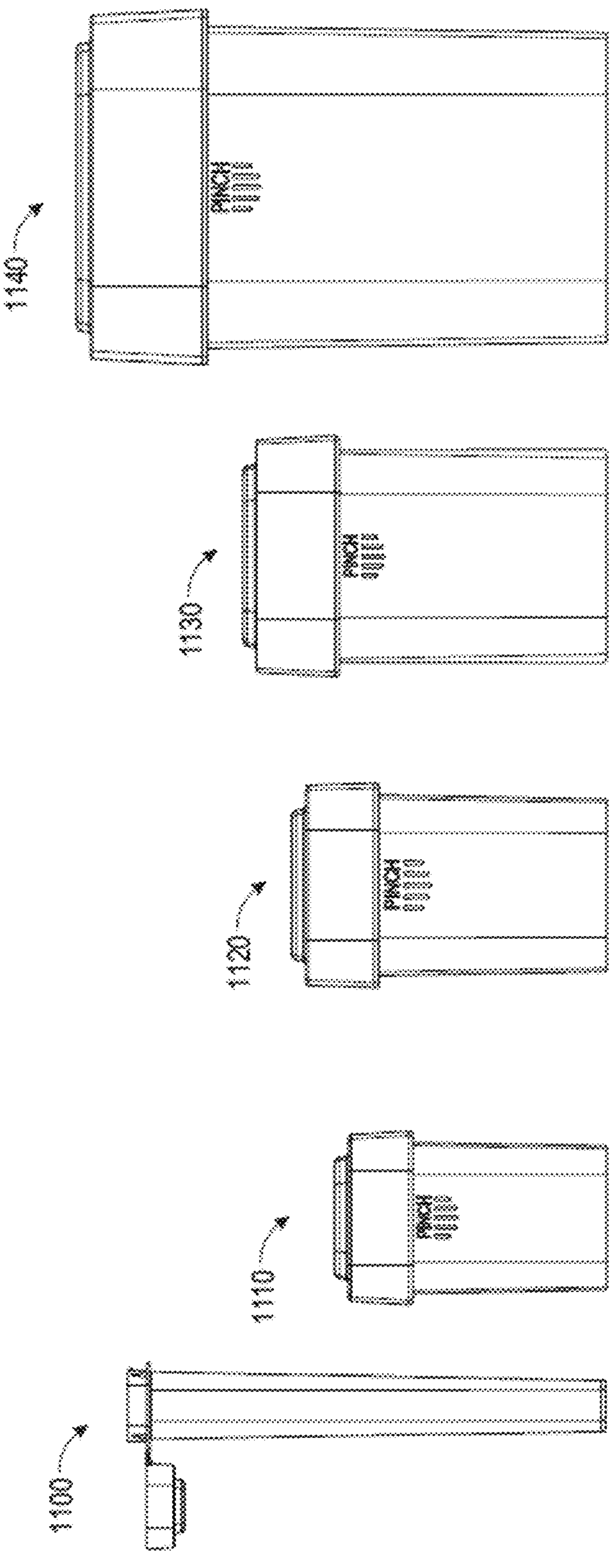
FIGS. 11A-E illustrate side views of embodiments of the child-resistant containers: a child-resistant tube (11A), a 15D container (11B), a 25D container (11C), a 45D container (11D) and a 145D child-resistant (11E).

FIG. 10 shows tray insert 500 within a tray frame 600, forming part of a modular container system 1000. Portions of male 521, 531 and female 522, 532 of the first and second locking mechanisms 520 and 530 protrude out from tray frame 600.

Child-Resistant Containers

Another aspect of the modular container system is a child-resistant containers and tube containers. The child-resistant containers and tube containers are configured to store, hold and/or preserve a substance or a material as well as providing a mechanism for child-resistance.

Generally, the child-resistant containers described herein comprise a container base and a container cap. When the container is in a closed configuration, the container base is engaged with the container cap. In a closed configuration, the container is substantially child-resistant, that is, a child could not or would have a difficult time removing the container cap from the container base.

The container base has a closed bottom end, an open top end and an outer surface. Embodiments of the container, including the container base, are substantially symmetrical in shape.

The container base can have markings on one or more sides of the container. The marking can be used for gripping the container base and/or distinguish one side of the container from another side. The markings can be, for example, slightly raised from the outer surface of the container base. A user squeezes or presses inwardly at the positions of the markings, simultaneously pulling upward the container cap, to remove the container cap from the container base.

A radially extending flange is part of container base. The flange structurally separates the container base into a lower body portion and an upper neck portion. The flange is positioned near and parallel to the top end of container base. The flange adds to the child-resistance of the container (e.g., to prevent children from getting under the cap and using nails/teeth to pry open). The flange structure and force ratio maintenance around that specific area of the container cap to diffuse squeeze force equally, and to separate cap and base, and it also prevents the cap from over compressing the seal. The combination of the forces of the flange and the retention features create the right amount of compression.

The container cap has an outer surface and an inner surface. The container cap also has an open bottom end (container base receiving end) and a closed top end. On the top end of the container cap, there is a shoulder portion, a ramp, and elevated portion. The shoulder, ramp and elevated portion allow for stacking a container base on top of the container cap (e.g., containers are self-stacking), and allow for a tray insert or tray frame to stack on top of the container cap. The container cap can have markings on the inner surface and/or outer surface.

The container cap can have an annular seal (e.g., o-ring) in the inner surface at or near the top end of the cap. The annular seal can help provide an barrier between the container environment and the external environment. Materials being stored in the container may be sensitive to air, water, oxygen, light, UV, temperature, bacterial, or combinations thereof.

The container cap has one or more base engagement elements. Each of the base engagement elements are positioned on the inner surface of container cap, e.g., on some of or all four sides of container cap. Each base engagement element comprises one or more rows of ridges, where each row has a plurality (e.g., 2, 3, 4, 5, 6, 7, 8, 9, 10 or more) of ridges.

Ridges can be arranged as an upper row of ridges and a lower row of ridges. There is a space between the two rows of ridges. The ridges are shaped such that they are slightly ramped. The ridges are sized and configured to slide and fit into a groove of a cap engagement element.

The child-resistant features of the container relate to the engagement of the container base with the container cap. One or more cap engagement element are part of the container base. The cap engagement element is made up of a raised surface or ledge. The raised surface is positioned near and parallel to the top end of container base. Just above a radially-extending flange and below the raised surface are longitudinally extending ridges or ramps. The ridges extend from at or near the raised surface to the flange. A groove is formed between two ridges (i.e., the space between the ridges is the groove). The ridges and groove provide guidance and alignment of the container cap in addition to providing a tight fit with the container base. The cap engagement element prevents a container cap from easily being taken off the container base or removed improperly. Generally, a cap engagement element is position on two, opposite sides of the container base. However, a single cap engagement element can be on the container base (e.g., for a tube container), or 3 or more cap engagement elements be on the container base.

FIGS. 11A-11E illustrate various embodiments of the child-resistant containers and tube-containers described herein. Child-resistant tube container 1100 and containers 1110, 1120, 1130, and 1140 vary in shape and size. Each of containers 1100, 1110, 1120, 1130, and 1140 are sized to fit into a matching tray insert (see FIGS. 1-9). The containers described herein are stackable on itself (e.g. FIG. 16A) and have features to make them child-resistant. Other features will be readily apparent in light of the foregoing.

Figure 12:
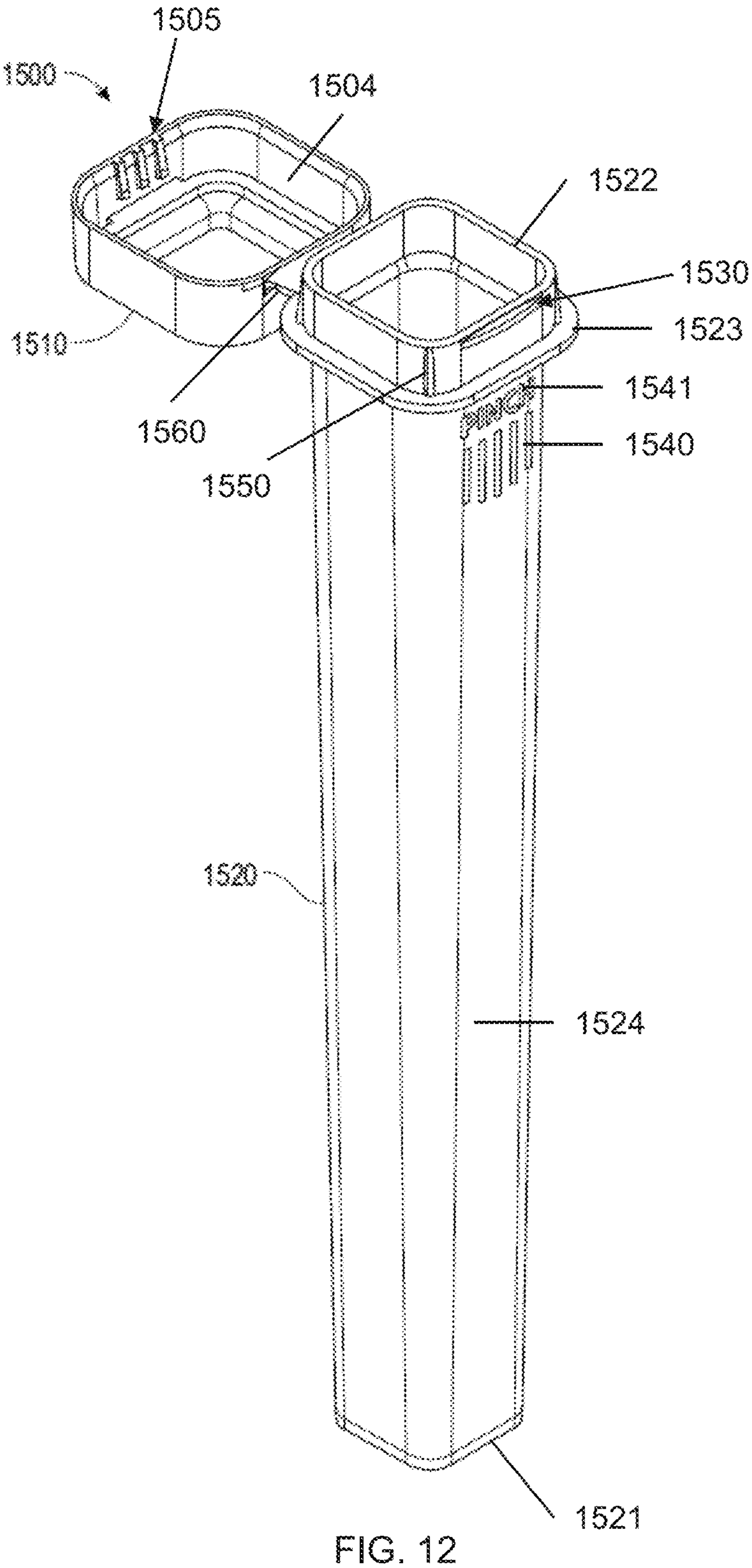
FIG. 12 illustrates a perspective view of an embodiment of a child-resistant tube container having a container base and a container cap in an open configuration.

Child-resistant tube container 1500 of FIG. 12, has a container base 1520 and a container cap 1510. Container cap 1510 is attached to container base 1520 via hinge 1560. Container cap 1510 has base engagement elements 1505 on an inner or inside surface 1504 of the container cap 1510. Base engagement elements 1505 can mate or engage with cap engagement elements 1530 on the container base 1520.

Container base has an outer surface 1524, an open top end 1522 and a closed bottom end 1521, the bottom end 1521 acting as a receiving portion for receiving a container cap. A cap engagement element 1530 is disposed on the outer surface 1524 of the container base 1520, between the top end 1522 and a flange 1523. Radially extending flange 1523 acts a physical stop when the container cap is on the container base. Textured or grip markings 1540 and text 1541 on the outer surface 1524 help the user open and close the tube container 1500.

Child-resistant container 1600 of FIGS. 13A-13D is another embodiment of the containers described herein. Container cap 1610 has a raised surface or elevated portion 1601 and a ramp 1602 that slopes to a shoulder portion 1603. Each of elevated portion 1601, ramp 1602 and shoulder 1603 define a closed top end of the container cap 1610.

Container base 1620 has an open top end 1622, a closed bottom end 1621, a radially-extending flange 1623 disposed on outer surface 1624. Container base 1620 also has a first cap engagement element 1630A and a second cap engagement element 1630B (FIG. 13F). The cap engagement elements 1630A, 1630B are disposed on the outer surface 1624 of the container base 1620, on opposite sides of the container base, and between the open top end 1622 and flange 1623. Cap engagement elements 1630A, 1630B each have a raised surface substantially parallel to the flange 1623, a plurality of ridges disposed between the raised surface and the flange 1623, the ridges forming at least one groove between the ridges. The at least one groove is sized to receive a ridge from a lower row of ridges on an inside surface the container cap 1610. Container base also has one or more anti-rotation locks-1650A and 1650B symmetrically and radially disposed on the outer surface 1624 on adjacent sides of the container base from the cap engagement elements 1630A, 1630B, and extend from about the flange 1623. Container base 1620 also has ramps 1660 symmetrically and radially disposed on the outer surface 1624 between a cap engagement element 1630 and an anti-rotation lock 1650. Ramps 1660 help align the container cap 1610 with the container base 1620. Container base 1620 can also have grip markings 1640 and/or text 1641 instructing the user how and where to open the container.

Figure 13A:
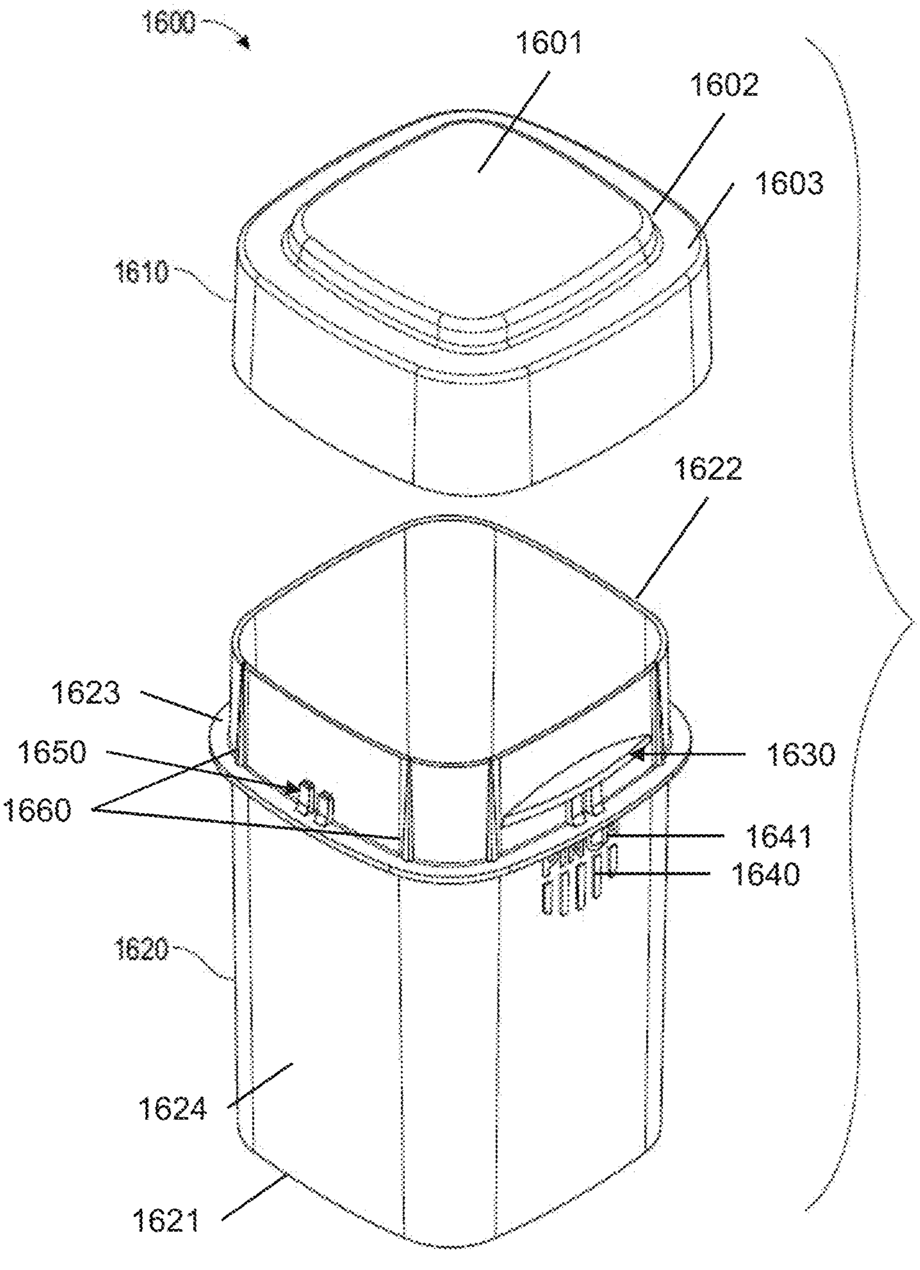
FIGS. 13A-13F illustrate various views of an embodiment of a child-resistant container.
Figure 13B:
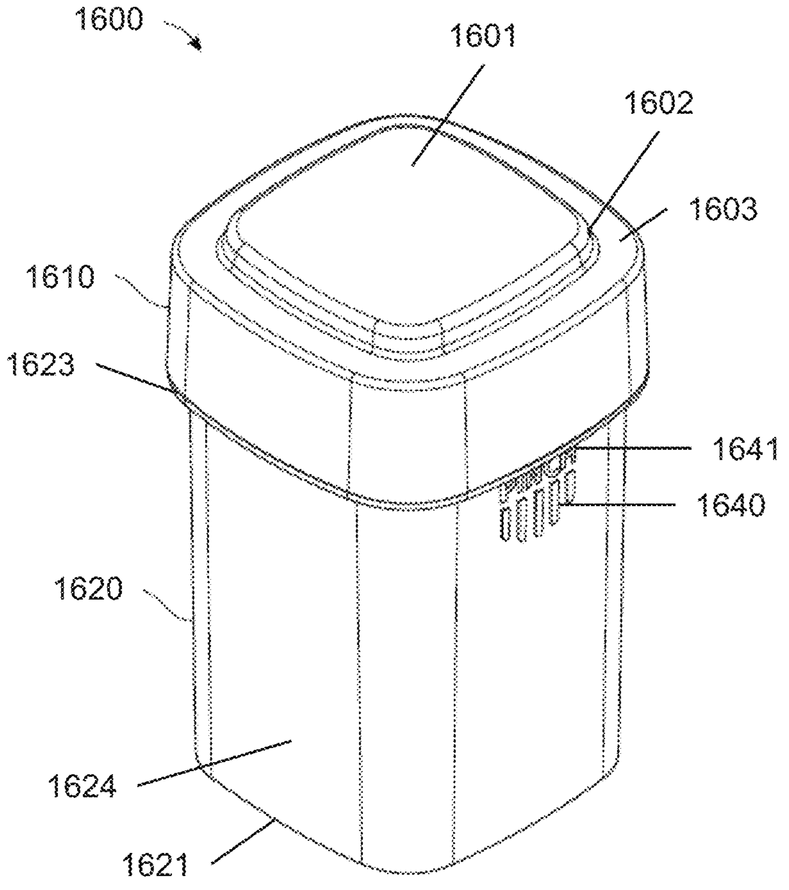
Figure 13C:
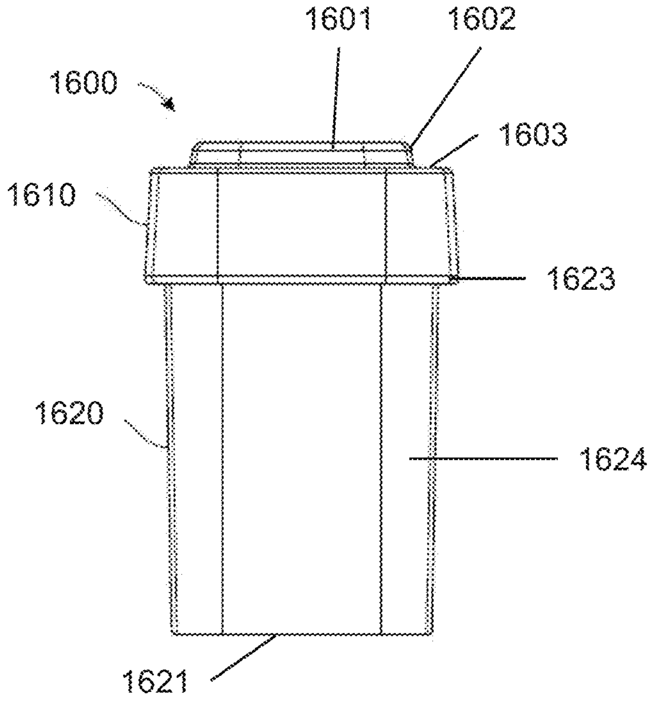
Figure 13D:
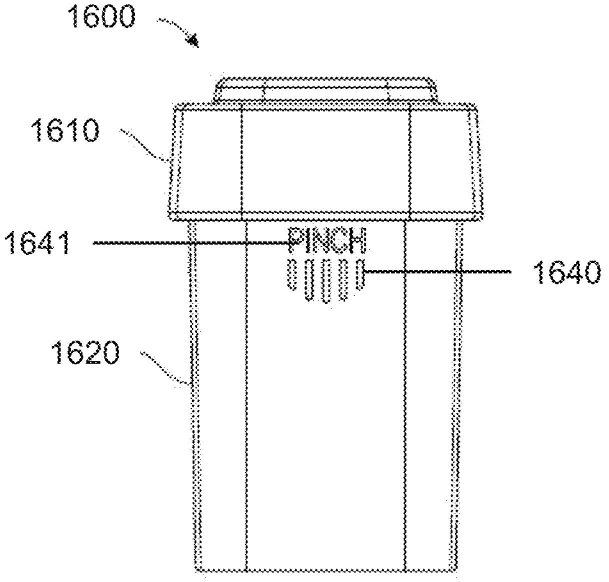
Figure 13E:
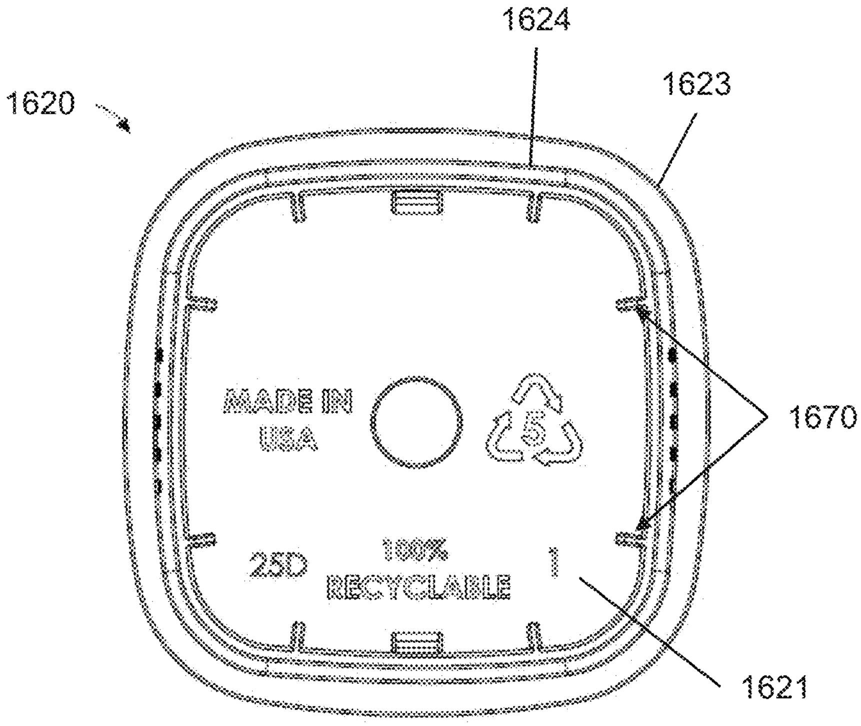
Figure 13F:
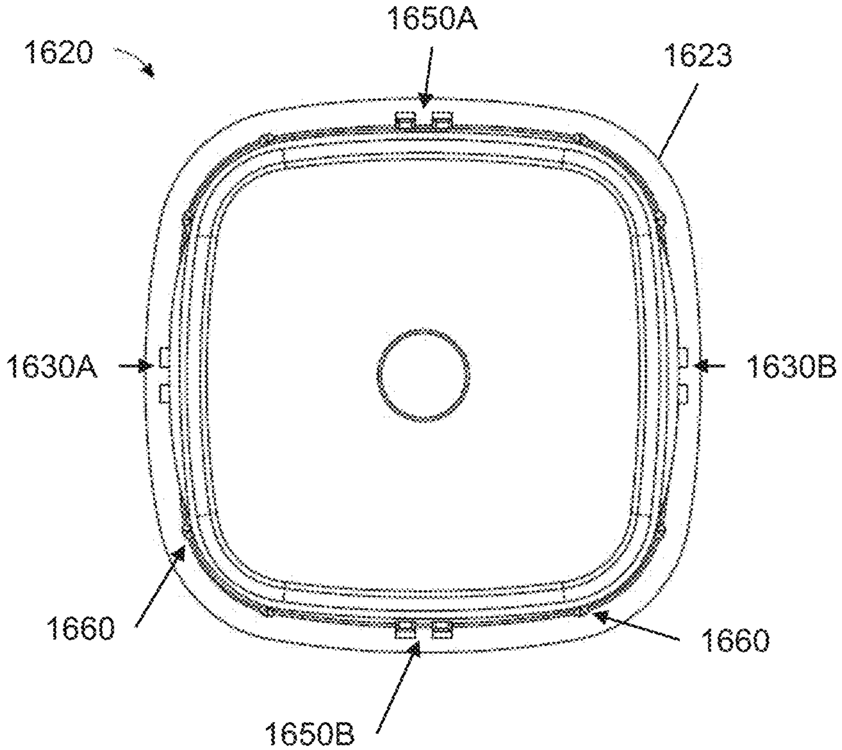

Container base 1620 also has one or more protrusions 1670 that help secure the container base 1620 when placed on top of a container cap, such as 1610 (FIG. 13E). The container base 1620 has a recessed floor on the closed bottom end 1621 to allow for securing and mating with another container.

Figure 14A:
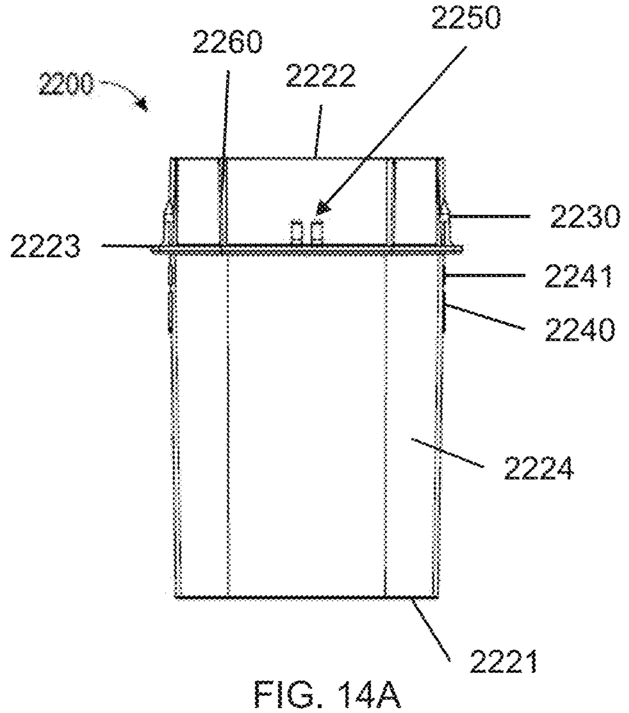
FIGS. 14A-14B illustrates side views of an embodiment of a container base.
Figure 14B:
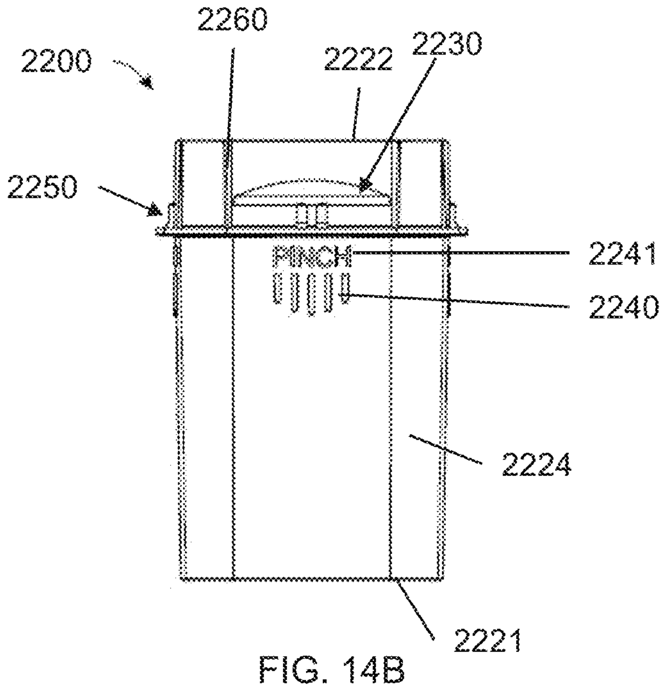

FIGS. 14A and 14B illustrate additional features of an embodiment of the container base 2200. Container base 2200 has a closed bottom end 2221, open top end 2222, radially-extending flange 2223, and outer surface 2224. Container base 2200 also has cap engagement elements 2230, disposed on opposite sides of the container base, on the outer surface, between the flange 2223 and open end 2222. Grip markings 2240 and text 2241 sit just below flange 2223, on the same side of cap engagement elements 2230.

Figure 15A:
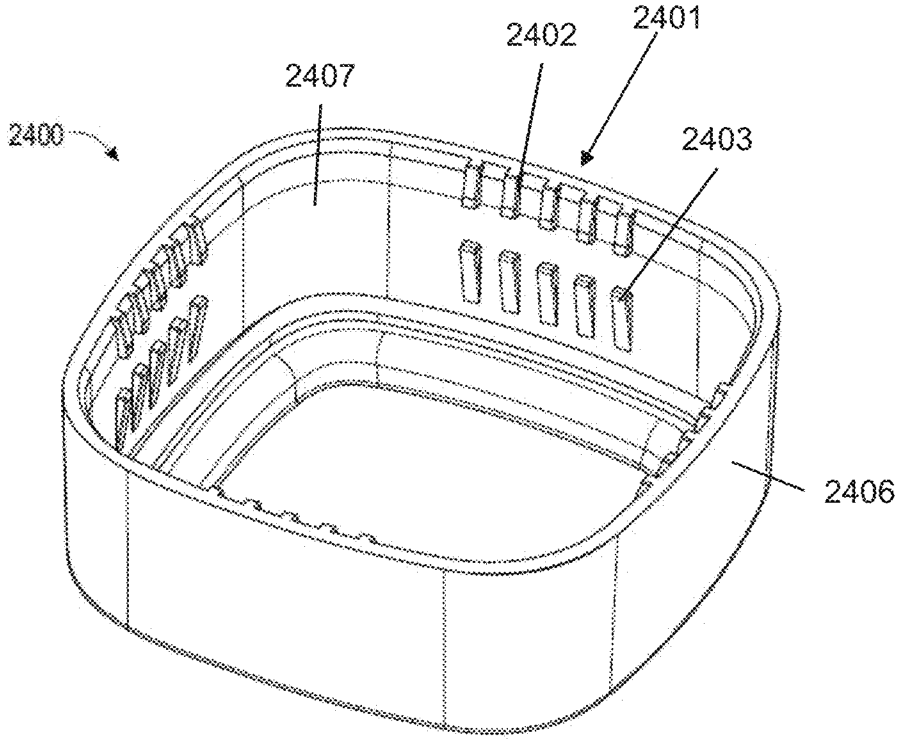
FIGS. 15A-15C illustrate various views of an embodiment of a container cap.
Figure 15B:
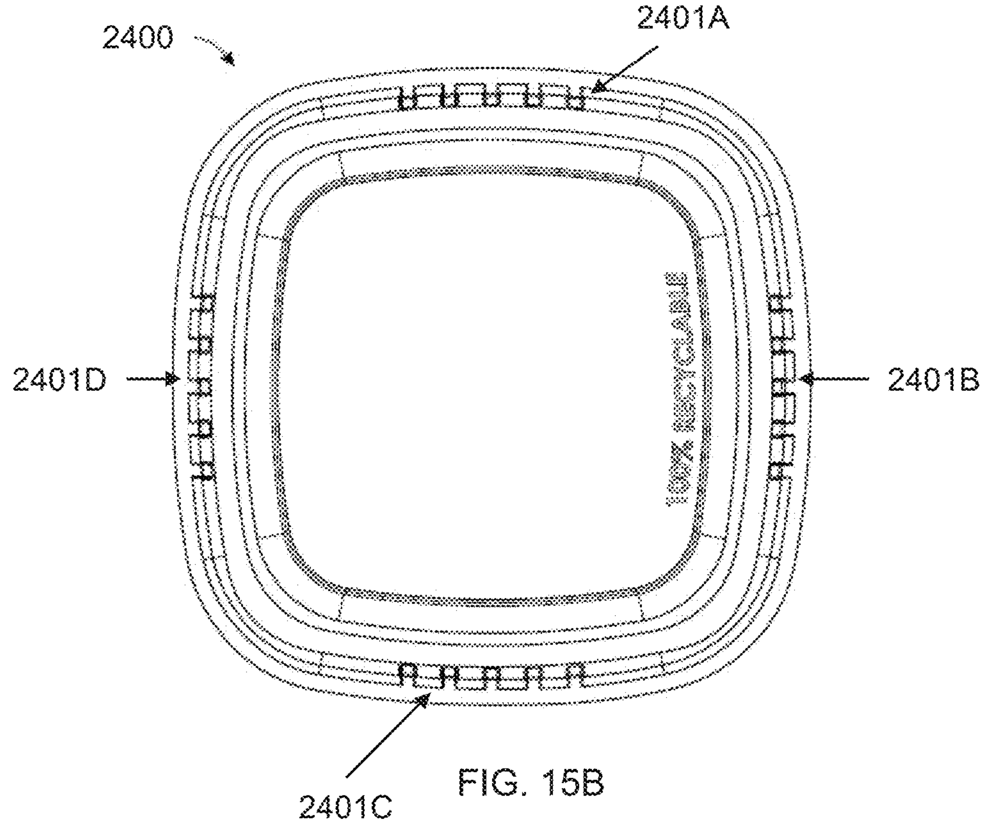

FIGS. 15A and 15B illustrate interior views of a container cap 2400. Container cap 2400 has an outer surface 2406 and an inner (interior) surface 2407. Disposed on the inner surface 2407 are one or more base engagement elements 2401. The one or more base engagement elements 2401 comprise an upper row of ridges 2403 and a lower row of ridges 2402 (each row relative to the cap when orientated on a container base), each row of ridges having 1 or more ridges. Base engagement elements 2401A, 2401B, 2401C and 2401D are disposed circumferentially around the interior surface 2407 of the container cap 2400. The one or more base engagement elements lockably secures with the first and second cap engagement elements (e.g., 2230 of FIG. 14B) to provide a child-resistant container when in a closed configuration.

Figure 15C:
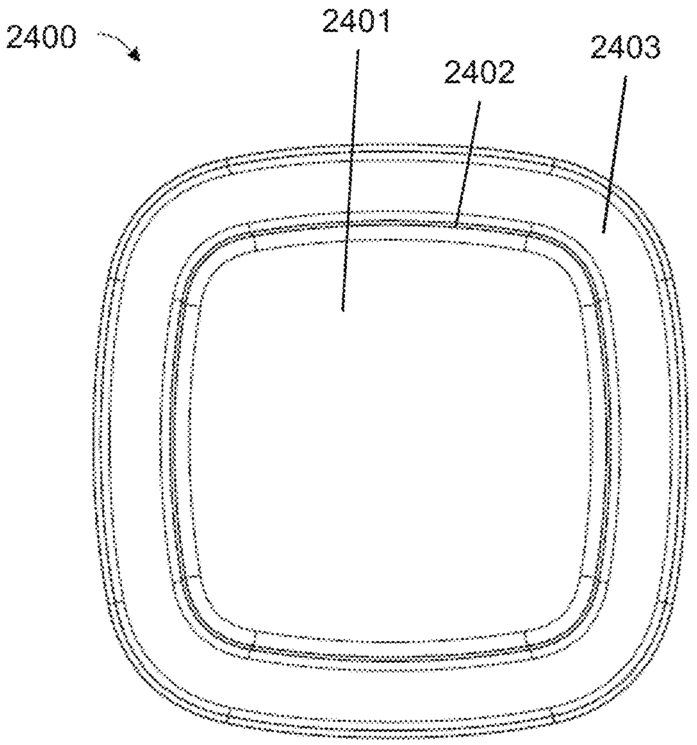

FIG. 15C is a top view of a container cap 2400, having an elevated portion 2401, ramp 2402 and shoulder 2403.

Figure 16A:
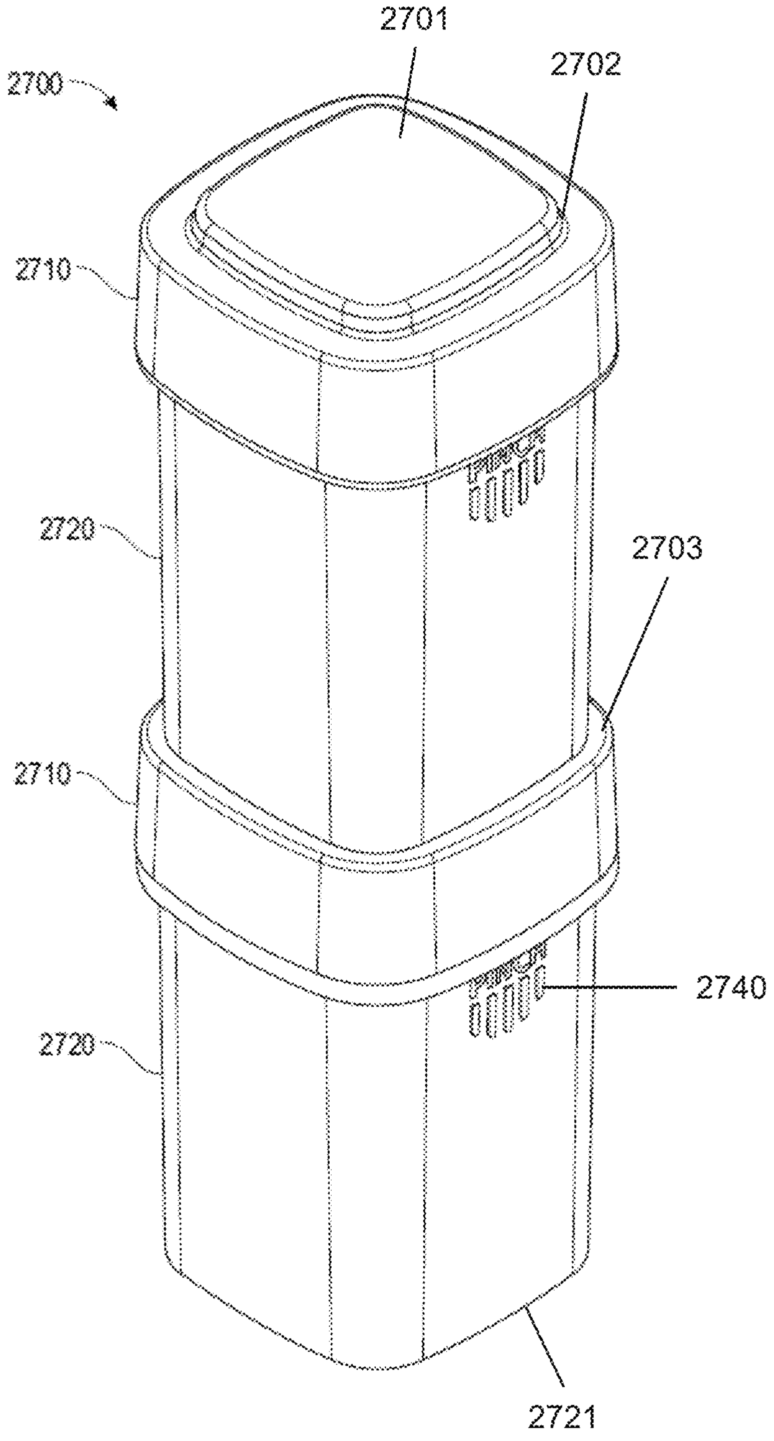
FIGS. 16A-16B illustrate various views of an embodiment of a child-resistant container stacked on top of another child-resistant container.
Figure 16B:
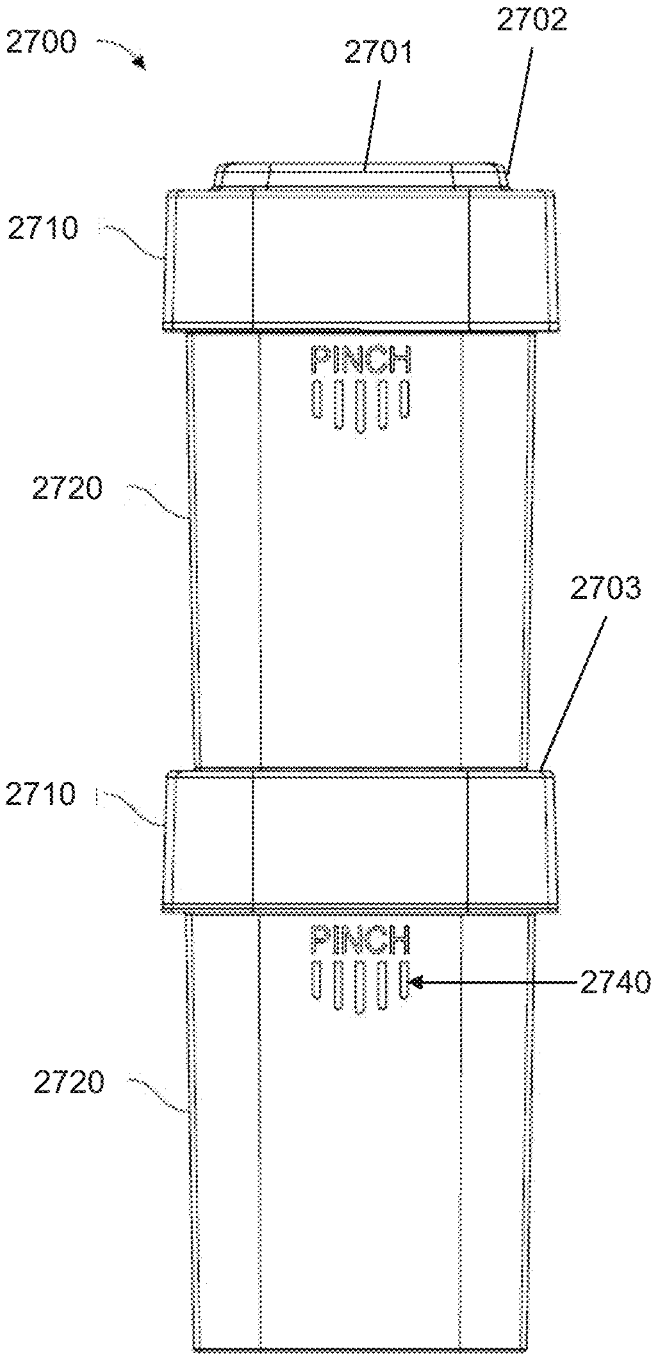

The child-resistant containers described herein are stackable, as illustrated in FIG. 16A. That is, one container 2700 having a container cap 2710 and container base 2720 can be stacked on top of another container having a container cap 2710 and a container base 2720. The elevated portion 2701 of a container cap 2710 from one container 2700 is configured to sit inside of a receiving portion defined by a recessed floor of the closed bottom end 2721 of container base 2720. The child-resistant containers and tube containers each have similar configurations to allow for self-stacking. See FIGS. 11A-11E.

Figure 17:
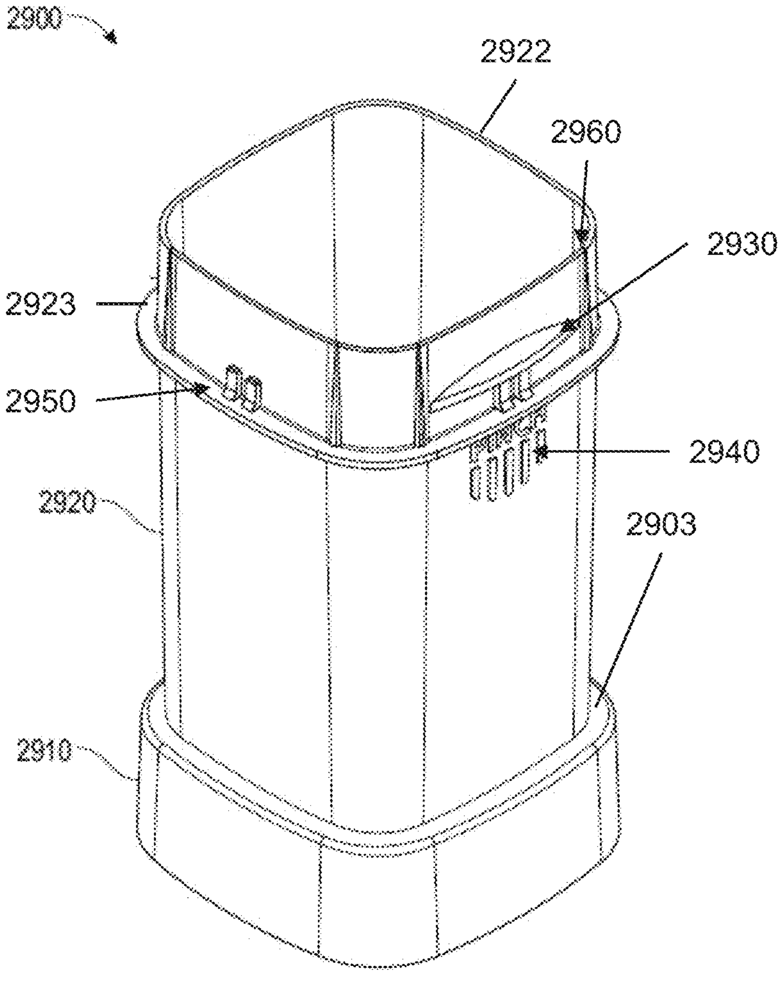
FIG. 17 illustrates an embodiment of a container base on top of a container cap.
Figure 18:
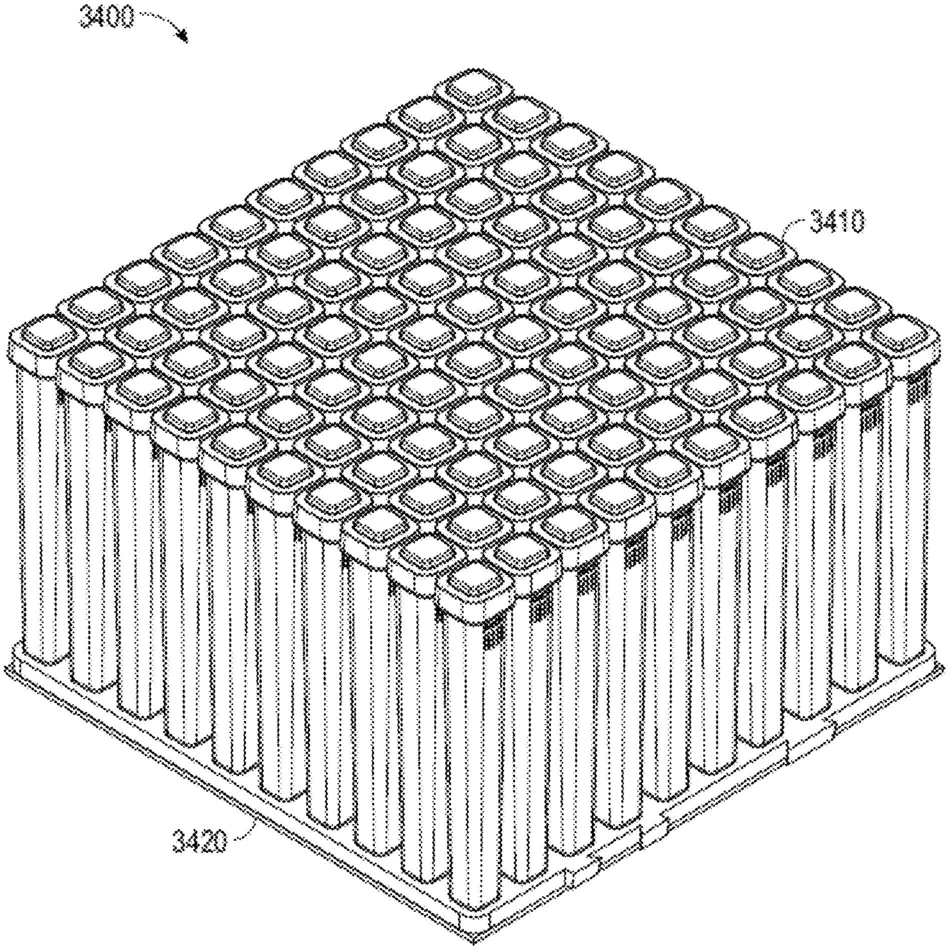
FIG. 18 illustrates a perspective view of an embodiment of a tray insert filled with an embodiment of child-resistant tube containers in a 10×10 configuration.
Figure 19:
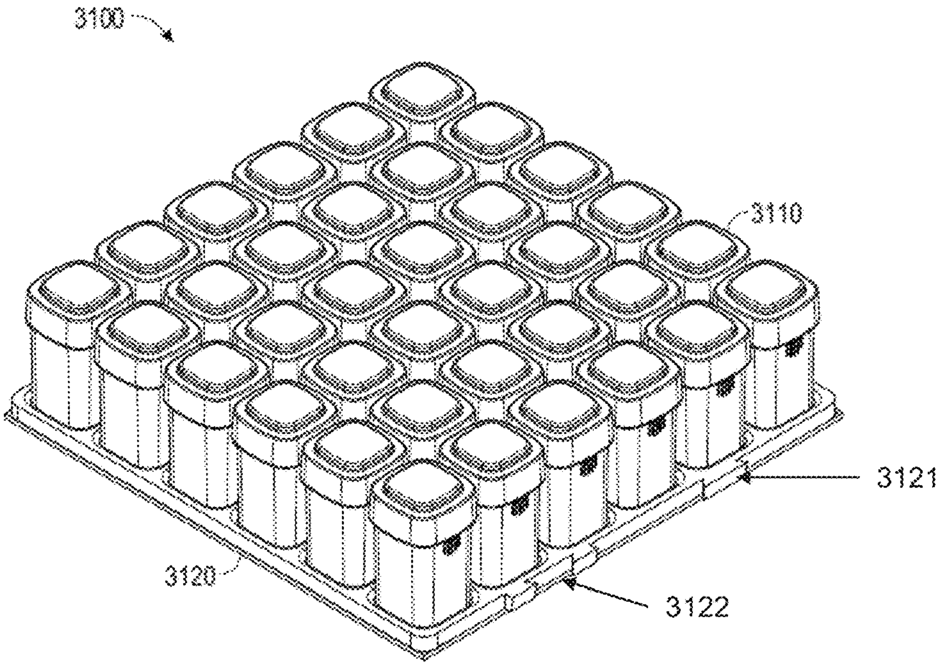
FIG. 19 illustrates a perspective view of another embodiment of a tray insert filled with an embodiment of child-resistant containers in a 6×6 configuration.
Figure 20:
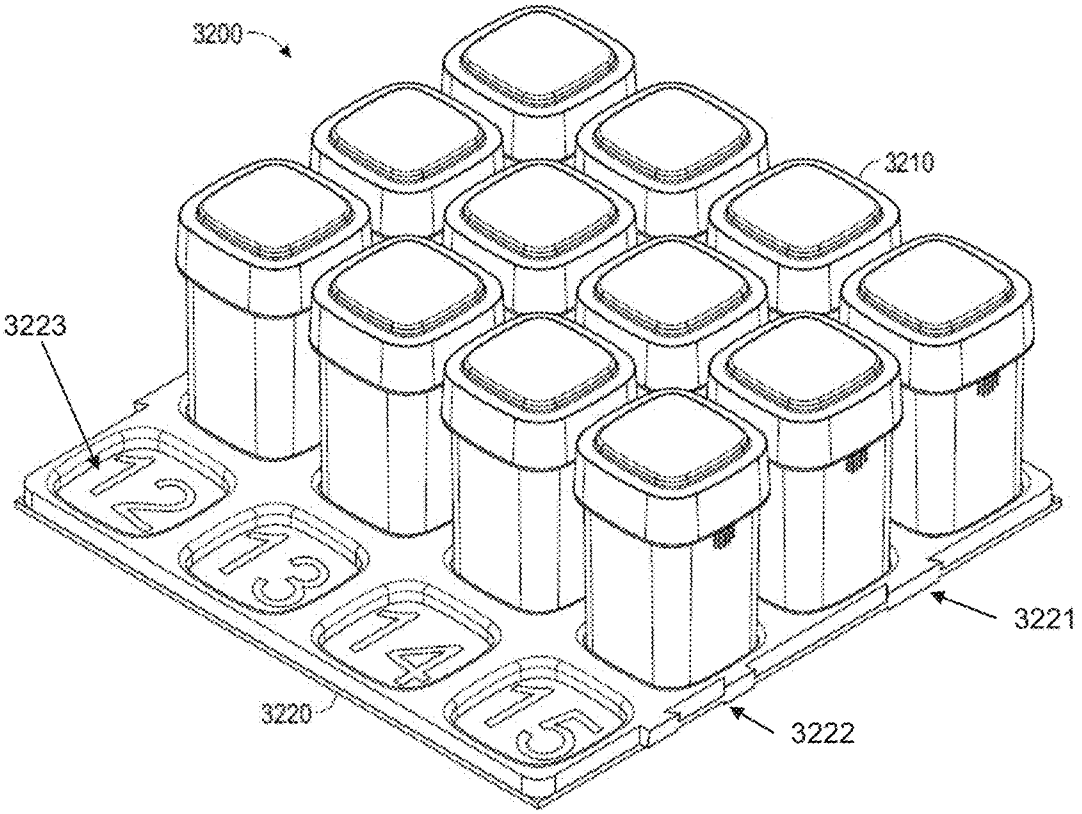
FIG. 20 illustrates a perspective view of another embodiment of a tray insert partially filled with another embodiment of child-resistant containers in a 4×4 configuration.
Figure 21:
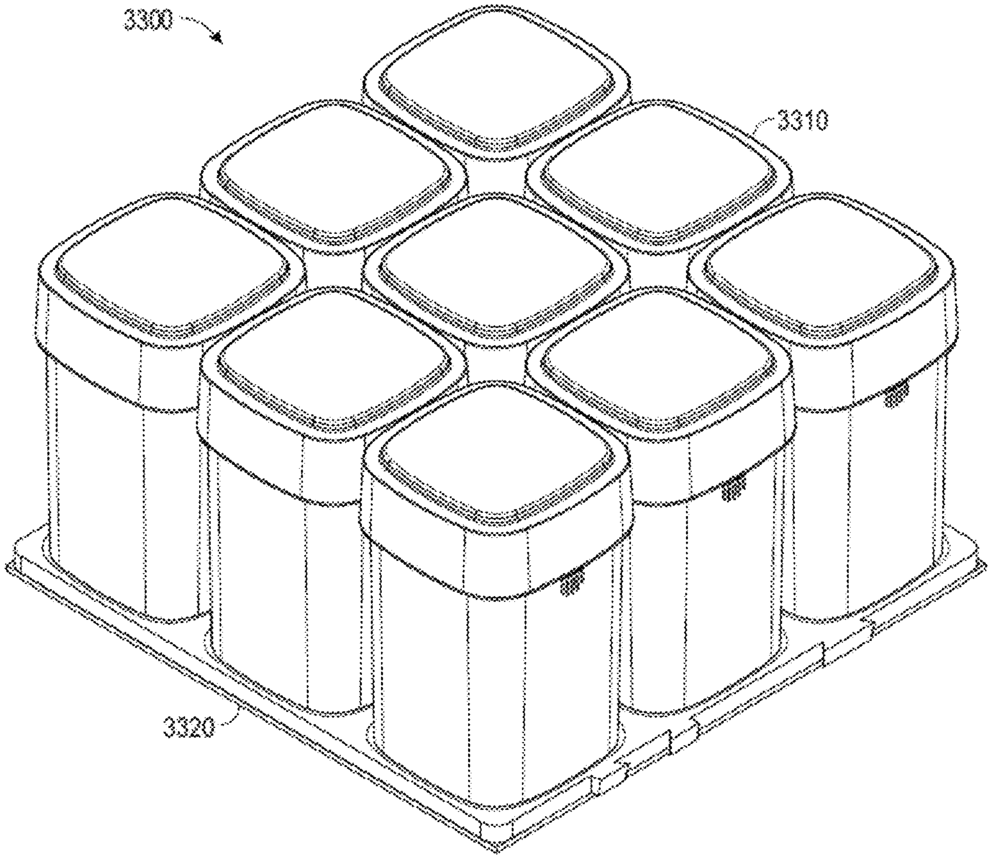
FIG. 21 illustrates a perspective view of another embodiment of a tray insert filled with another embodiment of child-resistant containers in a 3×3 configuration.
Figure 22:
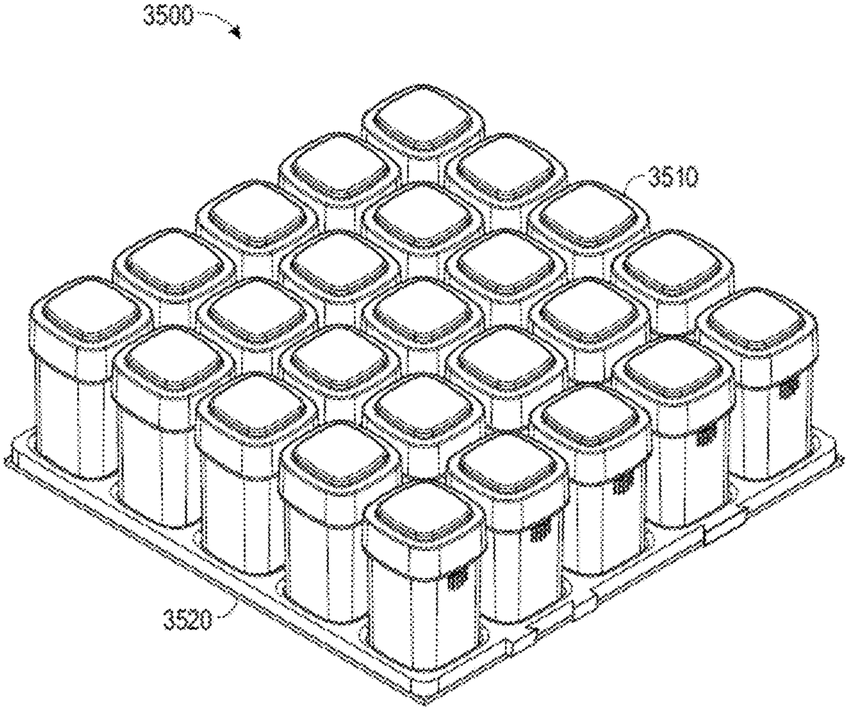
FIG. 22 illustrates a perspective view of another embodiment of a tray insert filled with another embodiment of child-resistant containers in a 5×5 configuration.

Similarly, FIG. 17 illustrates a container cap 2910 nested with the bottom end of a container base 2920. The elevated portion (not shown) and ramp (not shown) are nested within the recessed floor of the base 2920. Bottom end of container base 2920 rests on shoulder 2930 of container cap 2910.

As described herein, the container cap is configured to associate with the container base. The container base form an enclosure for containing materials, and the container cap encloses the open top end of the base. The container base and the container cap can be comprised of a plastic, plastic composite, reinforced plastic, metal, metal composite, a copolymer polypropylene, ultra-clarified polypropylene, colored PP, PET, PETE, PS, PC, glass or a combination thereof. The container base, the container cap could be prepared, for example, from a combination of any of the materials listed below: polypropylene, high density polyethylene, polystyrene, polytetrafluoroethylene, polyvinylchloride (PVC), polychlorotrifluoroethylene, phenol-formaldehyde resin, para-aramid, polyethylene terephthalate, polychloroprene, polyamide, polyacrylonitrile, copolyamid, aromatic polyester, poly-p-phenylene-2,6-benzobisoxazole; glass, plexiglass, resin, wood, rubber, elastomeric rubber, thermoplastic elastomer, silicone, fluorinated ethylene propylene, vulcanized rubber, metal.

Tray Inserts and Containers

As discussed above, the modular container system comprises tray insert and child-resistant containers, each described in detail above. FIGS. 18-22 illustrate various embodiments of a tray insert (3120, 3220, 3320, 3420 and 3520) and a child-resistant container (3110, 3210, 3310, 3410 and 3510). For example, referring to FIG. 20, in the instance where the tray insert 3220 is not completely filled with containers 3210, markings in recessed portions 3223 identify the number of containers 3210 that remain in the tray insert 3220. Since "12" is visible to the user, 12 containers remain on the tray insert 3220. Other numbering or labeling schemes can also be used to achieve the same result, i.e., to quickly and easily determine the remaining containers or, alternatively, the numbers of containers missing.

Figure 23:
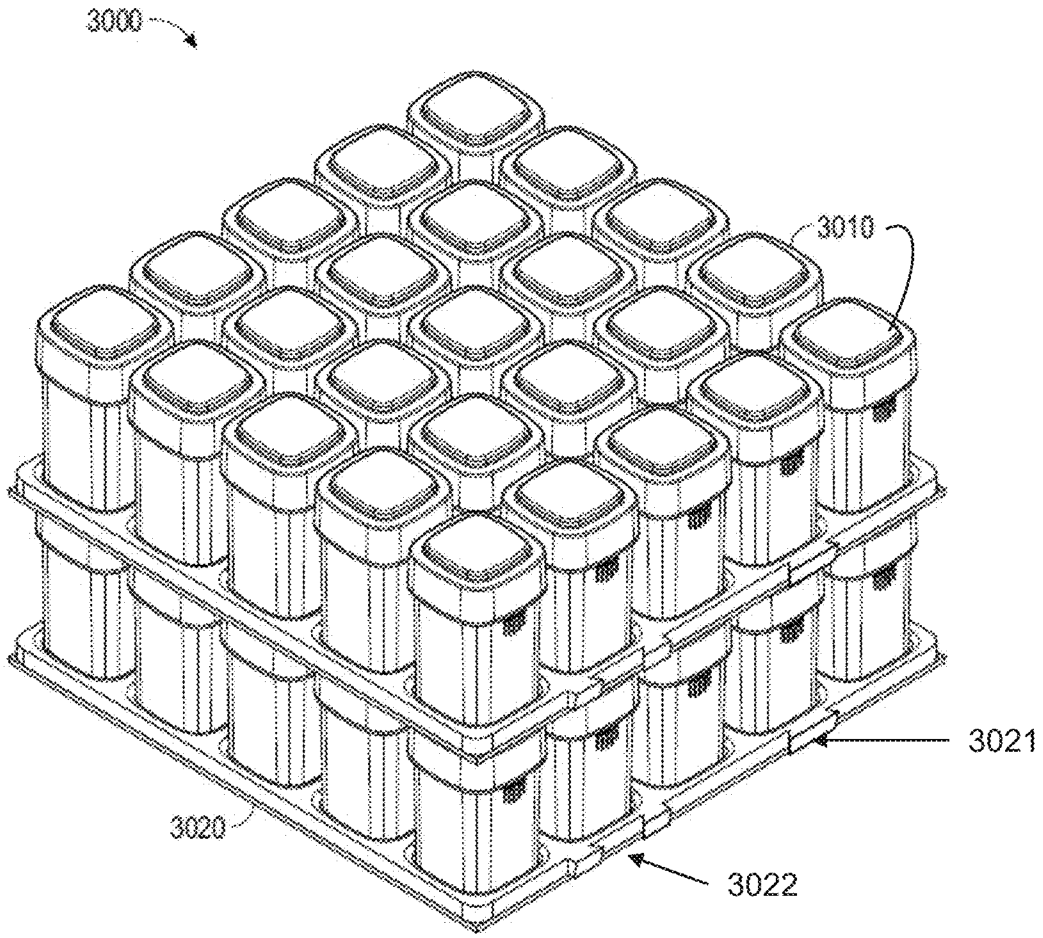
FIG. 23 illustrates a perspective view of the embodiment of FIG. 22 of a tray insert filled with an embodiment of child-resistant containers stacked on another tray insert filled with child-resistant containers, each of the tray inserts in a 5×5 configuration.

Another aspect of the modular container system allows for tray inserts with containers to stack upon other tray inserts with containers. Referring to FIG. 23, a stack of two tray insert/container "units" is illustrated. Although FIG. 23 illustrates the stacking of similar containers and tray inserts, any of the tray insert and child-resistant container embodiments disclosed herein can stack on another embodiment.

Figure 24:
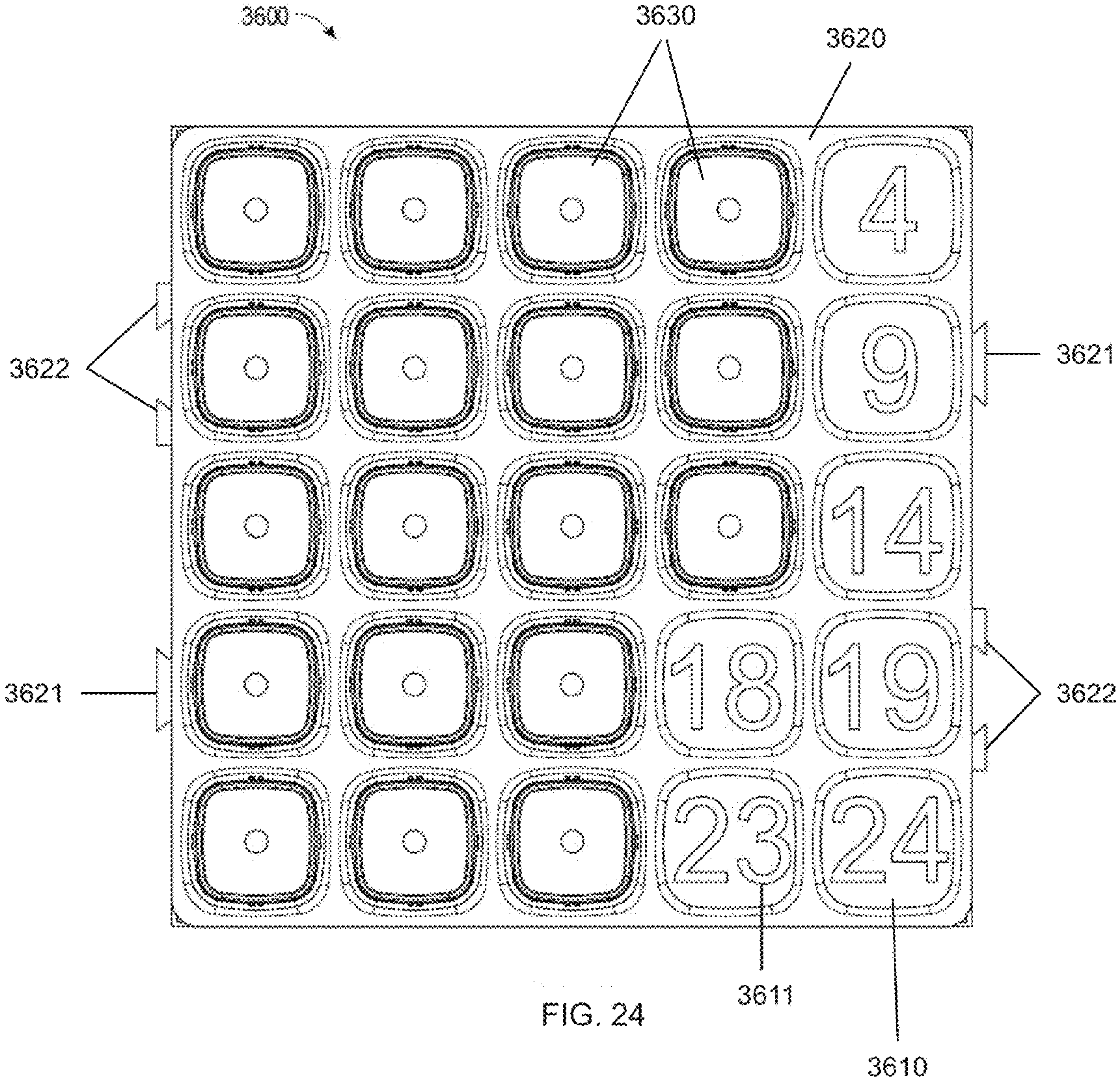
FIG. 24 illustrates a top view of an embodiment of a tray insert partially filled with an embodiment of child-resistant containers in a 5×5 configuration.
Figure 25A:
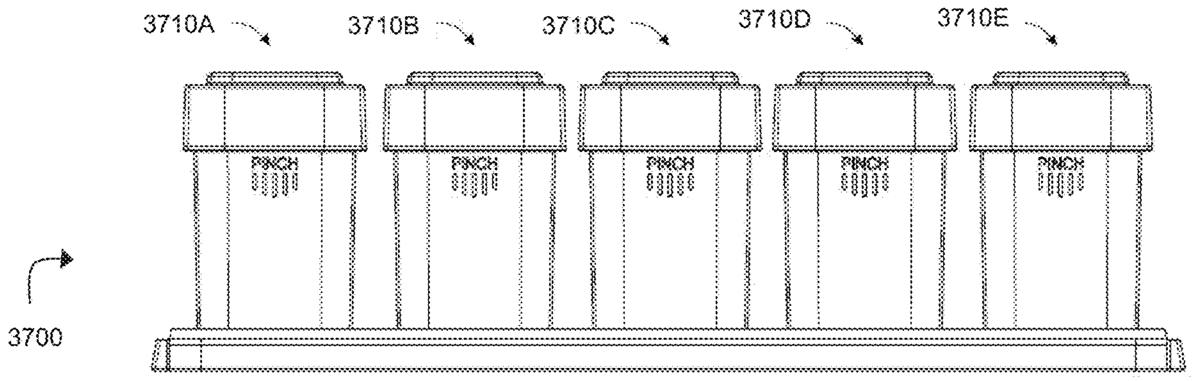
FIGS. 25A-25C illustrate various side views (25A-25B) and cross-sectional view (25C) of an embodiment of a tray insert with an embodiment of a child-resistant containers in a 5×5 configuration.
Figure 25B:
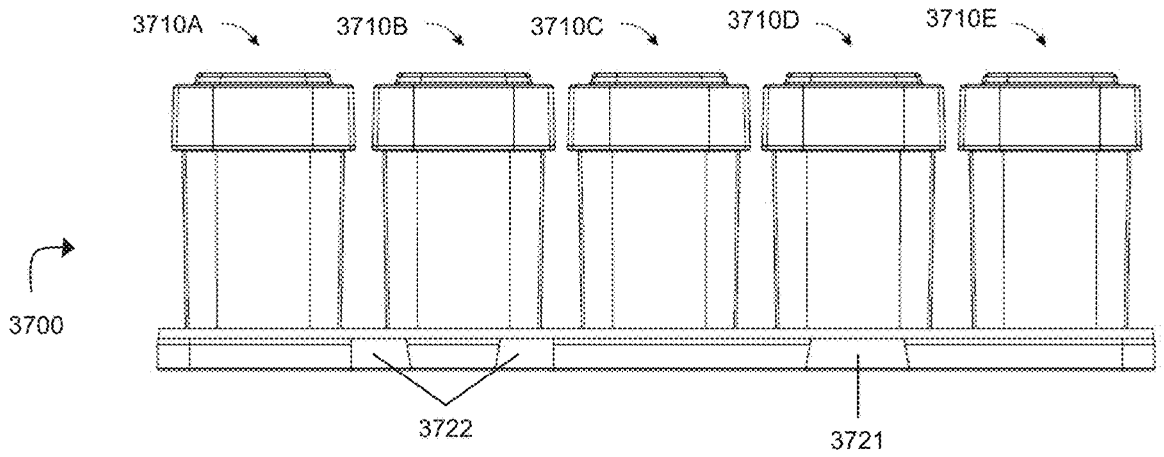
Figure 25C:
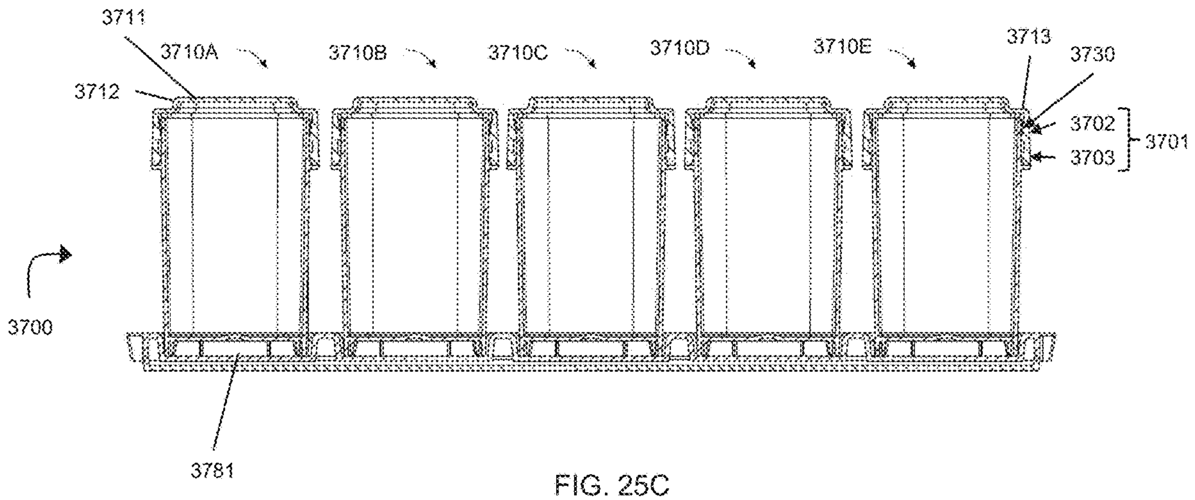

FIG. 24. is a top view of a tray insert 3620 partially filled with child-resistant containers 3630. Containers 3620 fit securely in recessed portions 3610, which prevent containers from moving or sliding within the tray insert 3620. Identifying mark 3611 aid in determining how many containers 3630 remain in the tray insert 3620. Tray insert 3620 has two pairs of locking mechanisms 3621, 3622. A male 3621 and a female 3622 locking mechanism are disposed on opposite sides of the tray insert 3620. The arrangement of the locking mechanism allows for multiple insert trays to lock together in a side by side arrangement, such that a male portion 3621 on one tray insert mates to a female portion 3622 on another tray insert FIGS. 25A-25C are side views of a tray insert/child-resistant container combination 3700 having child-resistant containers 3710A-E. Locking mechanisms 3721, 3721 are shown in FIG. 25B. A cross-sectional side view of the combination 3700 is shown in FIG. 25C. Row of ridges 3701 of the container cap comprise an upper row 3702 and a lower row 3703. Lower row 3703 engages with cap engagement element 3730 to provide a substantially child-resistant closed container. Container cap has an elevated portion 3711, ramp 3712 and shoulder 3713.

Tray Frames

Figure 26:
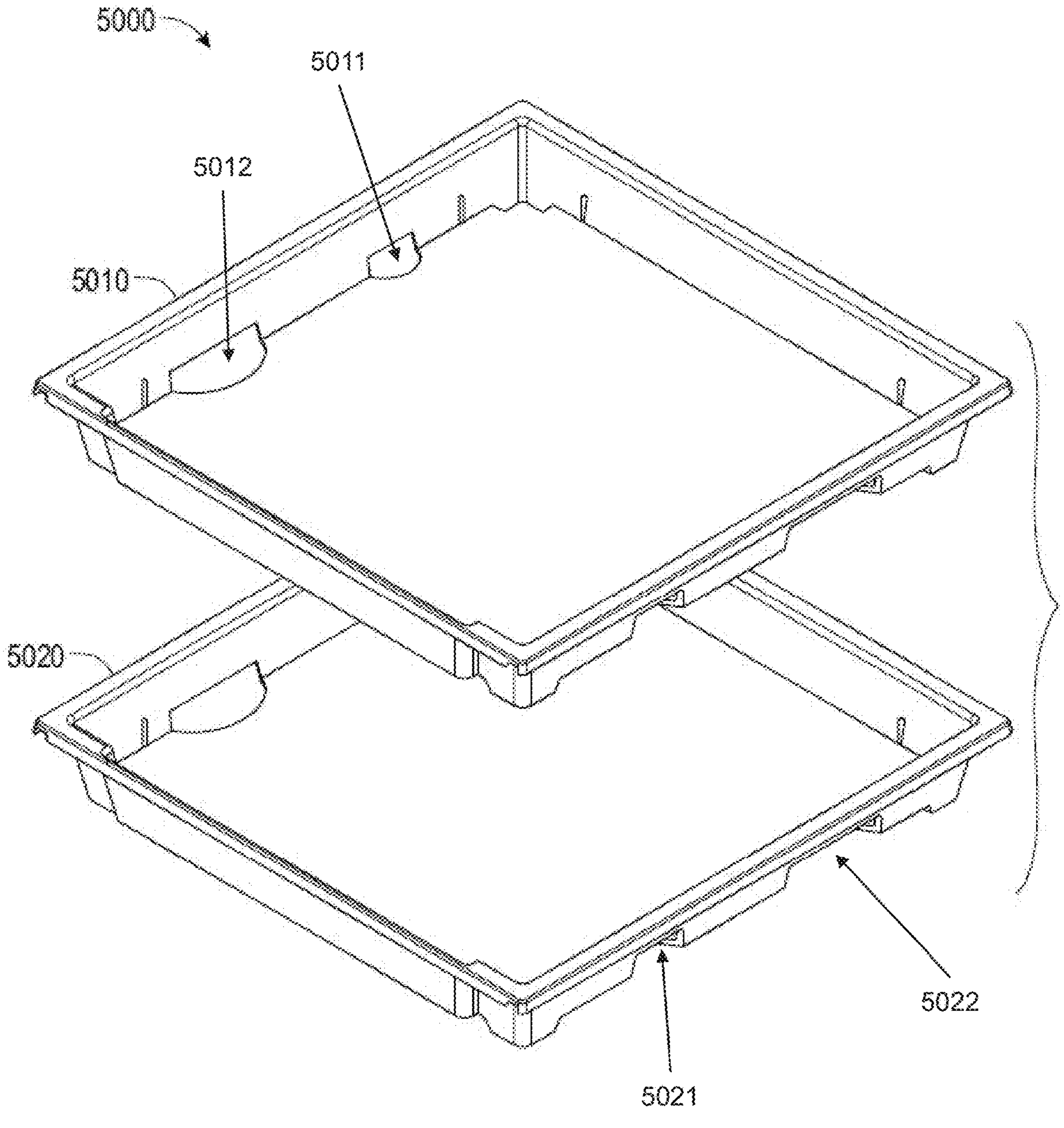
FIG. 26 illustrates an exploded view of an embodiment of a tray frame on top of another tray frame.
Figure 27:
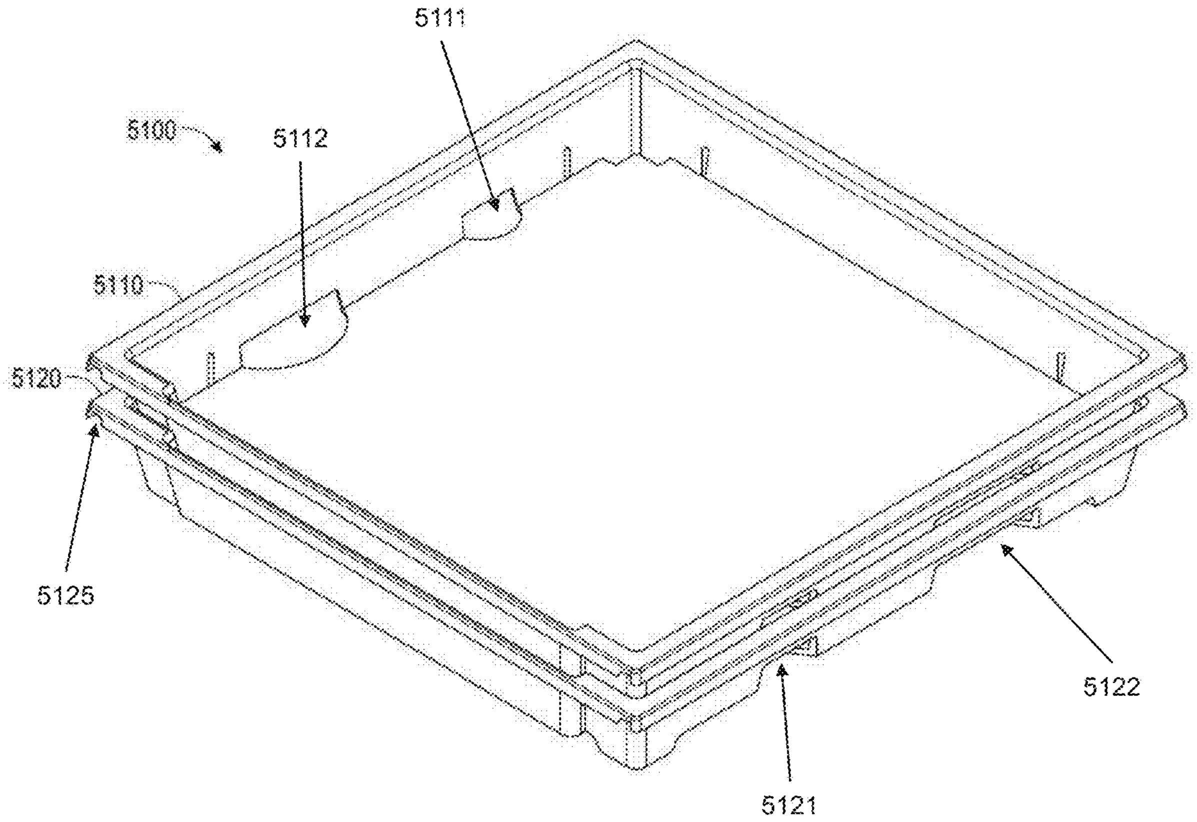
FIG. 27 illustrates a perspective view of an embodiment of a tray frame stacked on top of another tray frame.

Another part of the modular container system is tray frame as illustrated in FIGS. 26 and 27. Tray frame 5010 is sized and configured to nest within another tray frame 5020 forming a stack of tray frames 5000. Each tray frame 5010, 5020 have one or more slots 5011, 5012, 5021, 5022 disposed on a side of the tray. The slots are sized to allow for a locking mechanism of the tray insert to protrude out of the tray frame. Slot 5011 of frame 5010 is sized so a male connector of a locking mechanism on a tray insert can protrude out from the tray frame. Slot 5012 of frame 5010 is sized so a female connector of a locking mechanism on a tray insert can protrude out from the tray frame. Slots 5011 and 5012 are disposed on a left and right side of the tray frame, corresponding to the first and second locking mechanisms of a tray insert.

FIG. 27 illustrates tray frames 5110 and 5120 nested within one another forming a stack of tray frames 5100. Any number of tray frames can be stacked for storage or other uses. A notch 5125 provides correct orientation of the tray frame, so that multiple tray frames all align in the same direction and orientation.

Tray frame also have rounded feet or corners (see FIG. 34B, 4091) on the bottom of the tray frame. The corners 4091 each has a rounded edge so that it is able to lock or mate with an outside radius of a child-resistant container cap, regardless of container size (e.g., 15D, 25D, 45D, or 145D). The tray frame feet 4091 are configured so that the tray frame does not slide or otherwise move when placed on top of containers.

The disclosure provides for a single tray frame that universally fits with multiple tray inserts. The tray inserts, although having similar dimensions, are unique for the container type it is holding. Other embodiments include having the tray frame and tray insert formed as a single unit.

Other Components

The modular container system can include a tamper evident element. The tamper evident element can be found on the tray insert, tray frame, and/or child-resistant containers. For example, the tamper evident element is a break-away component. The break-away component can comprise a seal, a tape, or a combination thereof.

The modular container storage system can further comprises a product identification, a manufacturer's note, a RFID tag, NFC tag, barcode, or a combination thereof.

In some aspects, the parts of the modular container system further comprise a writing surface compatible with a pen, a pencil, or a marker. In some aspects, the modular container system further comprise a space available for a specialty material or a surface application to easily remove stickers and labels without leaving residue.

In some aspects, the modular container storage system further comprises one or more sensors. For example, any sensor can be used in the modular container storage system such as an environmental sensor (e.g., a humidity sensor, an oxygen sensor, a temperature sensor, a barometric pressure sensor, a light sensor), a gyroscope, an accelerometer, a GPS sensor, a magnetometer, a proximity sensor, a fingerprint sensor, and an retinal sensor.

Methods of Using and Storing

The present disclosure relates to a method for packaging and/or storing a material. The method of packaging comprises providing a modular container system having a child-resistant container and introducing the material into the container. The method includes adding the child-resistant containers to one or more tray inserts and then adding the one or more tray inserts into tray frames.

The material being packaged can be a material sensitive to one or more environmental factors. Sensitivities include, but it not limited to, air, water, oxygen, light, UV, temperature, bacterial, or combinations there. For example, the material is a pharmaceutical, nutraceutical, herbal material, botanical material, food product, animal-based product, plant-based product, or the like. Thus, parts or all of the modular container system create a substantially air-tight seal, liquid-tight seal or a both.

The cap engagement elements and base engagement elements are configured to cooperatively engage in a locked position that releasably secures the container cap to the container base in a closed position in which the open end of the base is covered by the cap prohibiting access to the open cavity. Securing the container cap on the container base comprises the following steps: sliding and pressing the container cap over the open end of the container base along the long axis of the container. The container is locked by: sliding and pressing the cap over the raised surface of the container base, until an audible noise is heard as well as a tactile snap. In other words, the sides of the container cap have to be pressed with a force sufficient to overcome the hindrance of the raised surface and then settle in a secure base-cap engagement, such that one end of the plurality of the ridges of the inner sides of the container cap press against the raised surface. Simultaneously, one or more ridges will lodge or fit within the groove of the cap engagement element of the container base, and one or more ridges of the container base may lodge in between ridges on the container cap. This forms a secure coupling of the base engagement element of the container cap and the cap engagement element of the container base. Additional grooves and ridges can be included in order to increase the hardship or complexity of accessing the contents or using the container.

In some embodiments the complete coupling of the base engagement element and the cap engagement element is designed to release an acoustic signal, a snap-sound, which lets the operator know that the cap is secure on the base and thereby the contained elements are secure in the child-resistant container.

Visual signals are provided on the surface of the container which correspond to the site and direction of force to be applied. For example, a marking for grip is provided on the surface of the container base, designating the side of the container base that has the cap engagement element. A second marking is provided on the cap usually on the side not opposite, but adjacent to the one containing the cap engagement element. It corresponds to application of pulling force on the container cap to dissociate the cap from the base, while the container base is held by another hand.

To access the contents from a closed container, application of a predetermined amount of compression force radially inward on two opposing sides of the base is necessary. One would press with finger two opposing sides of the base having the cap-engagement element, and marked by the grip markings to resiliently reduce a first width of the base along a compression axis to a second width, which releases the cap engagement element from the base engagement element. This frees the cap from the pressure of the raised surface on the sides of the cap. In one aspect the predetermined amount of force can be applied to a position on opposed caps sides adjacent to the cap engagement elements. The markings constitutes the visual indicator of the side for the application of the compression force in order to open the container. The container cap and container base can be uncoupled from the closed position by axially pulling the container base and the container cap away from each other along an longitudinal axis of the container. The pulling can occur after the engagement elements are in an unlocked position. The predetermined amount of force is between about 1 pounds to about 9 pounds, or between about 2 pounds to about 8 pounds, about 2 points to about 6 pounds, or between 3 pounds to 5 pounds. The predetermined amount of force is at least about 4 pounds.

The cap engagement element and base engagement element can be configured to disengage from a locked position to an unlocked position in which the container cap and container base can be uncoupled from a closed position to an open position such that the open cavity of the container is accessible. A change from a locked position to an unlocked position is achieved by radially inwardly applying a predetermined amount of compression force at two opposing sides of the base to resiliently reduce a first width of the base along a compression axis to a second width, where the second width is slightly lesser than the first width. In some aspects, the predetermined amount of force can be applied to a position on opposing base sides, wherein, at least one side of the base comprises the cap-engagement element. The cap and base can be uncoupled from the closed position by pulling apart the cap along an longitudinal axis of the container by simultaneously applying a predetermined force of compression on two opposing sides of the base, where at least one of the two opposing sides comprises the cap-engagement element, and pulling the cap away from the base along the longitudinal axis. In still other aspects, the cap can be pulled using cap sides corresponding to a position parallel to the expansion axis. In some aspects, the reduction is from a first width to a second width, where the second width is less than the first width, and the second width expands to the first with resiliently upon release of pressure.

The present disclosure relates, in various aspects, to containers and devices for storing substances of restricted use. The consumer Product Safety Commission (CSPC, www.cspc.gov) provides guidance for packaging drugs and other controlled substances for special child-resistant and senior friendly packaging (CRP). The CSPC also administers the Poison Prevention Packaging Act of 1970 (PPPA), 15 U.S.C. § 1471-1476. Substances for restricted use as intended in this application include but are not limited to tobacco, medicines or federally controlled substances, nutraceuticals or vitamins. The substance may be sensitive to environmental exposure and is liable to decay, decomposition, loss of desirable property upon exposure, for example, pharmaceutical medications, herbal products, botanical products. A substance for storage in a container of the invention may include but is not limited to one or more of the components or drugs classified under Schedules I, II, III, or Schedule IV in the Controlled Substance Act (CSA) by the Drug Enforcement Authority of the United States of America (https://www.dea.gov/druginfo/ds.shtml): combination products with less than 15 milligrams of hydrocodone per dosage unit (Vicodin), cocaine, methamphetamine, methadone, hydromorphone (Dilaudid), meperidine (Demerol), oxycodone (OxyContin), fentanyl, Dexedrine, Adderall, and Ritalin; products containing less than 90 milligrams of codeine per dosage unit (Tylenol with codeine), ketamine, anabolic steroids, testosterone; or products including Xanax, Soma, Darvon, Darvocet, Valium, Ativan, Talwin, Ambien, Tramadol.

The disclosure provides a method of storing a material in a child resistant container. The method involves providing a child-resistant container comprising a container base having a cap engagement element and a container cap having a base engagement element, wherein the cap engagement element is configured to engage and reversibly couple to the base engagement element cooperatively; introducing the material in the base; and securing the cap over the base, wherein the cap engagement element engages and couples to the base engagement element to form a child-resistant container.

Figure 28:
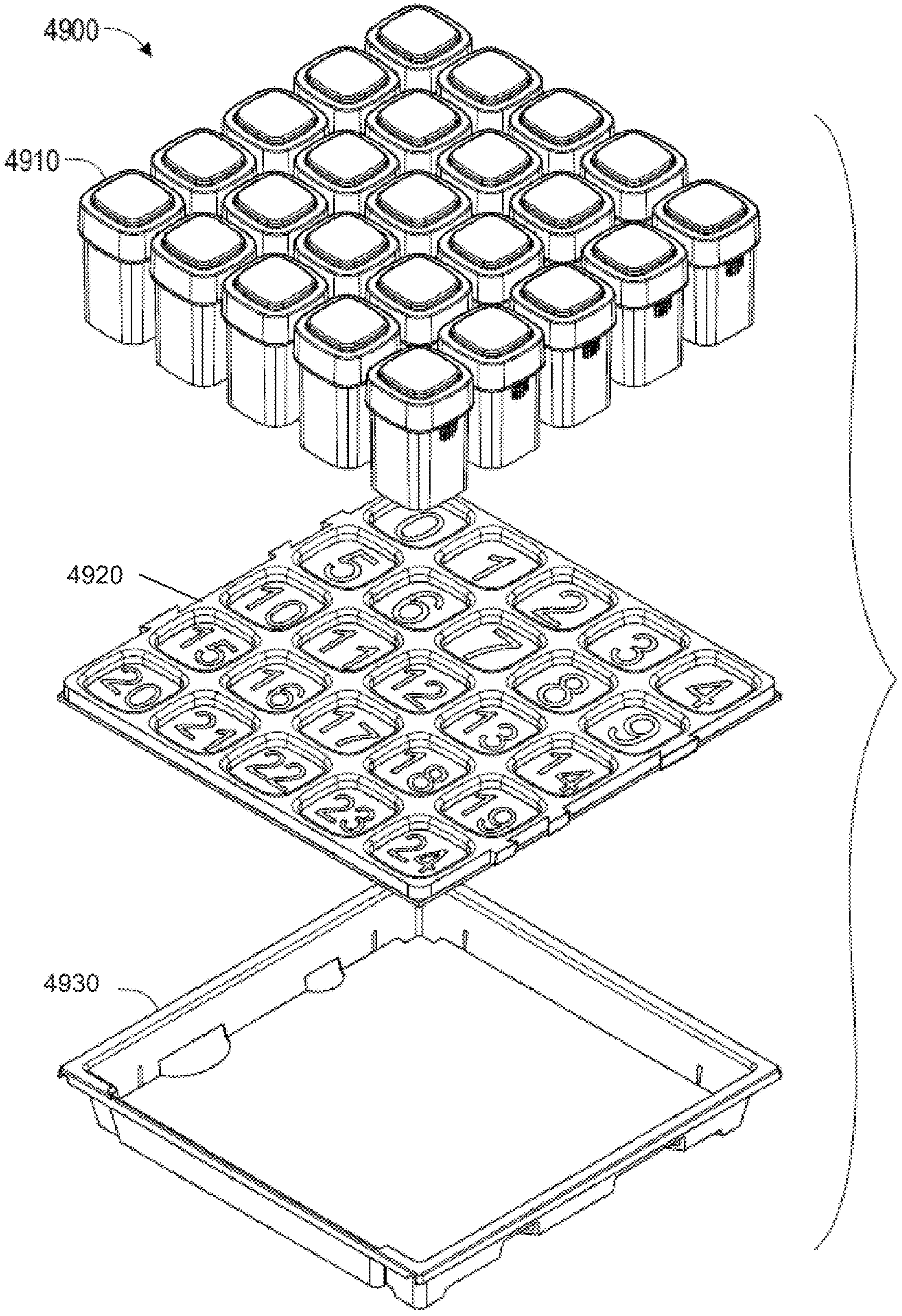
FIG. 28 illustrates an exploded view of an embodiment of a modular container system having a tray frame, a tray insert and child-resistant containers.

FIGS. 28-34C illustrate various embodiments of the modular container system having a tray frame, a tray insert, and one or more child-resistant containers. For example, FIG. 28 is an exploded view of child-resistant containers 4910, tray insert 4920, and tray frame 4930. As disclosed herein, tray insert 4920 corresponds to a specifically sized container 4910. Tray insert 4920 is in a 5×5 configuration and therefore capable of holding 25 containers 4910.

Figure 29:
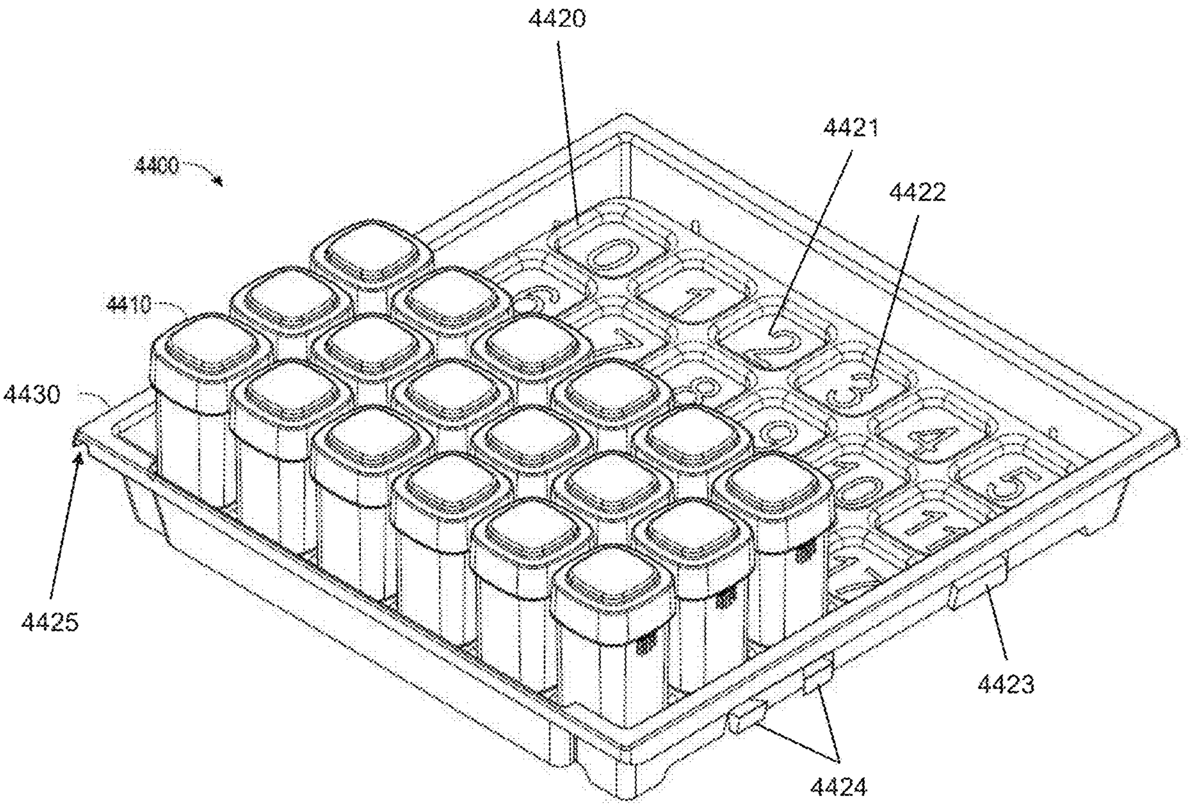
FIG. 29 illustrates a perspective view of another embodiment of a modular container system having a tray frame, a tray insert and child-resistant containers.

FIG. 29 illustrates an embodiment of the modular container system 4400 having a tray frame 4430, tray insert 4420, and plurality of containers 4410. Tray insert 4420 is in a 6×6 configuration capable of holding 36 containers 4410. Tray insert 4420 has a plurality of recessed portions 4421, each with an identifying numerical mark 4422. Male 4423 and female 4424 connectors of a first locking mechanism of the tray insert 4420 protrude out of the slots in the tray frame 4430.

Figure 30:
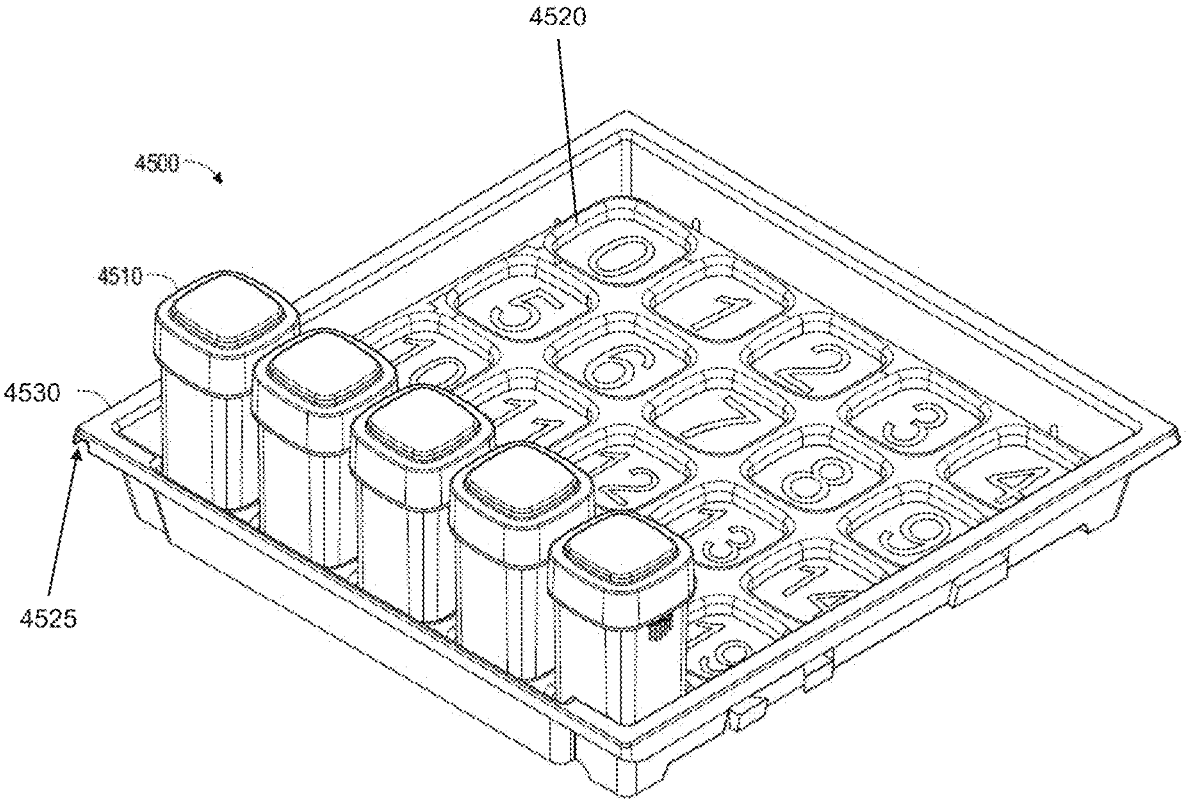
FIG. 30 illustrates a perspective view of another embodiment of a modular container system having a tray frame, a tray insert and child-resistant containers.
Figure 31:
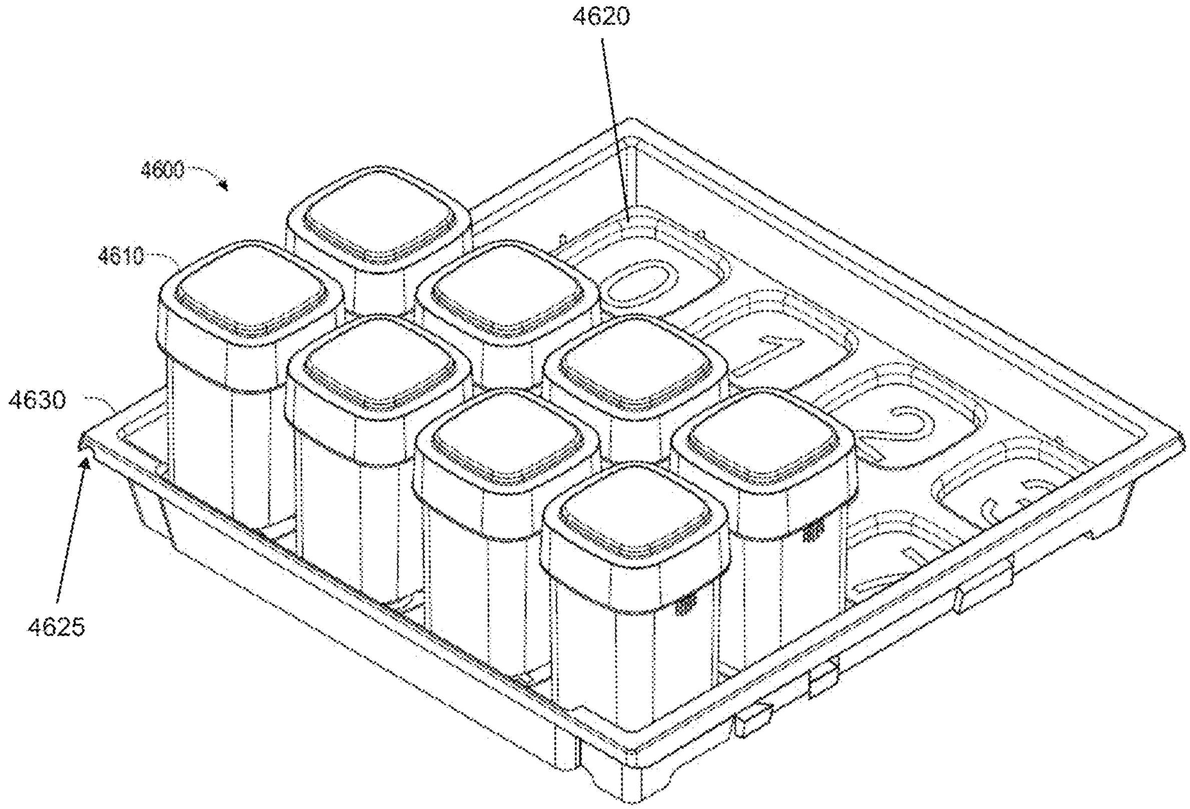
FIG. 31 illustrates a perspective view of another embodiment of a modular container system having a tray frame, a tray insert and child-resistant containers.
Figure 32:
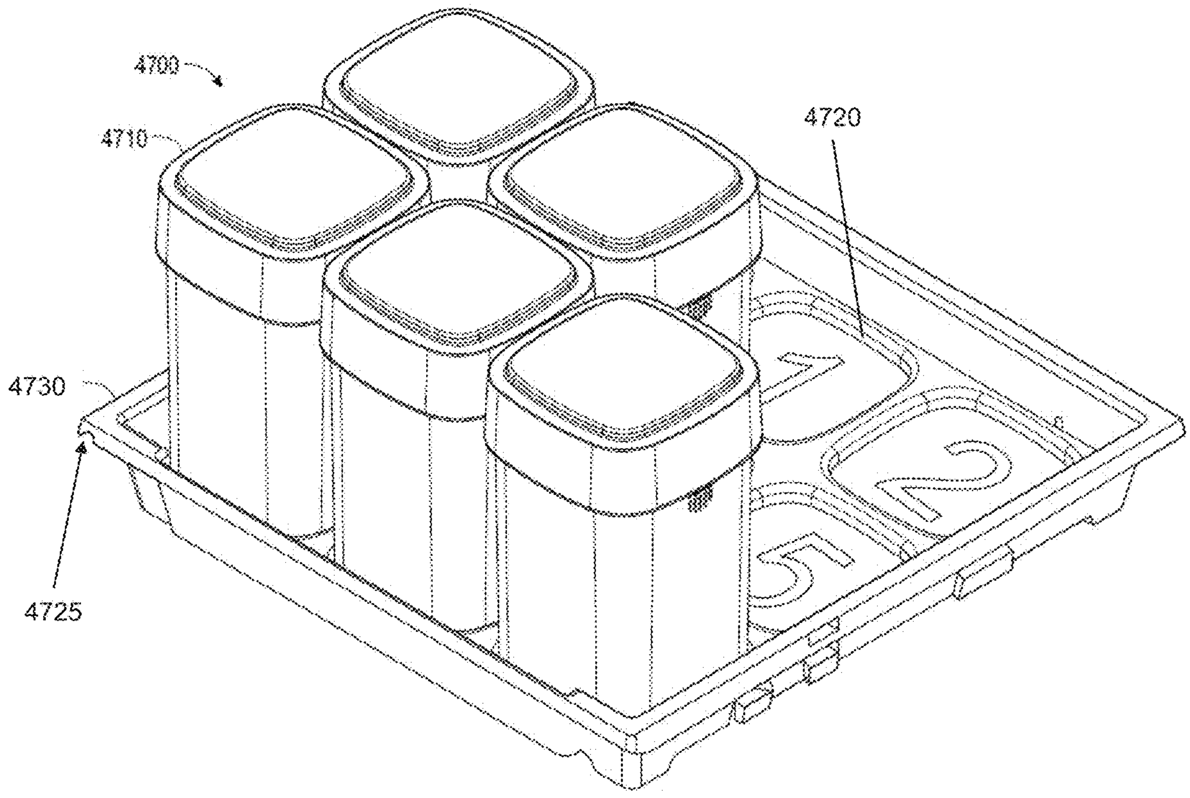
FIG. 32 illustrates a perspective view of another embodiment of a modular container system having a tray frame, a tray insert and child-resistant containers.
Figure 33:
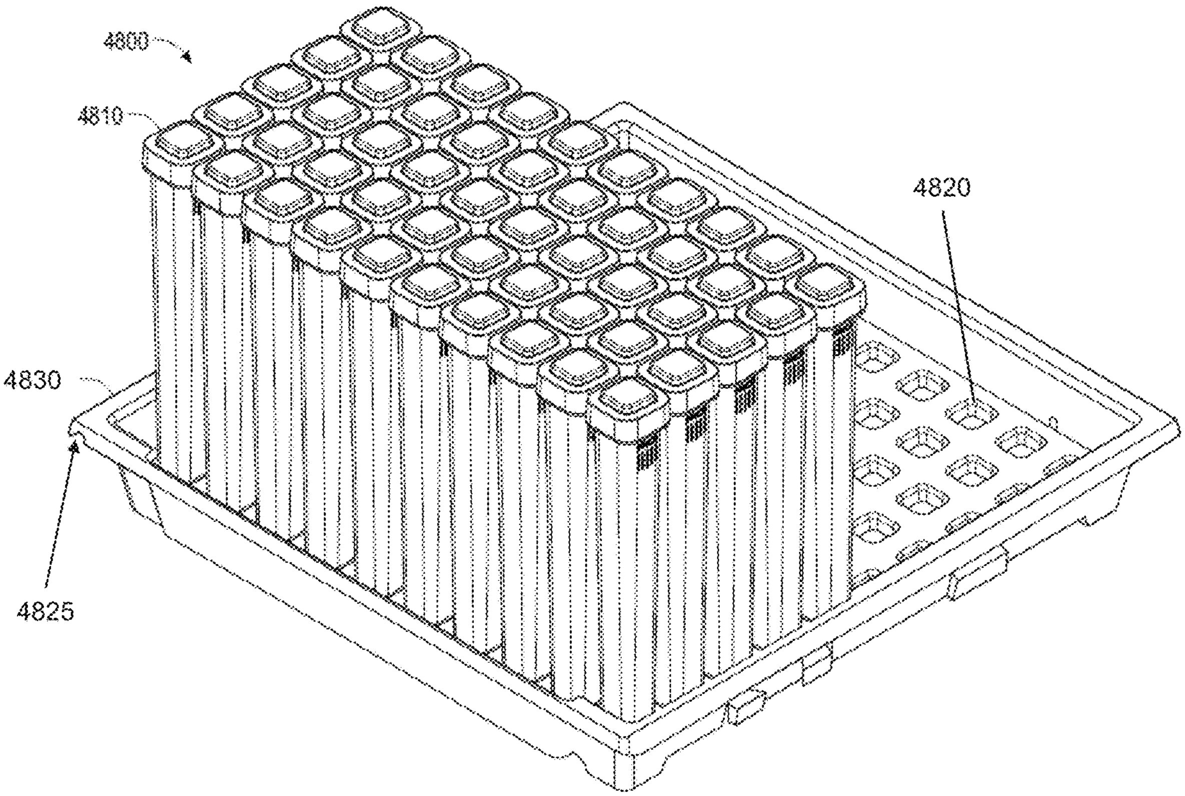
FIG. 33 illustrates a perspective view of another embodiment of a modular container system having a tray frame, a tray insert and child-resistant tube containers.

FIG. 30 illustrates another embodiment of a modular container system 4500 having a tray frame 4530, tray insert 4520 and a plurality of containers 4510. Tray insert 4520 is in a 5×5 configuration capable of holding 25 containers 4510. FIG. 31 illustrates another embodiment of a modular container system 4600 having a tray frame 4630, tray insert 4620 and a plurality of containers 4610. Tray insert 4620 is in a 4×4 configuration capable of holding 16 containers 4610. FIG. 32 illustrates another embodiment of a modular container system 4700 having a tray frame 4730, tray insert 4720 and a plurality of containers 4710. Tray insert 4720 is in a 3×3 configuration capable of holding 9 containers 4710. FIG. 33 illustrates another embodiment of a modular container system 4800 having a tray frame 4830, tray insert 4820 and a plurality of tube containers 4810. Tray insert 4820 is in a 10×10 configuration capable of holding 100 tube containers 4810.

Figure 34A:
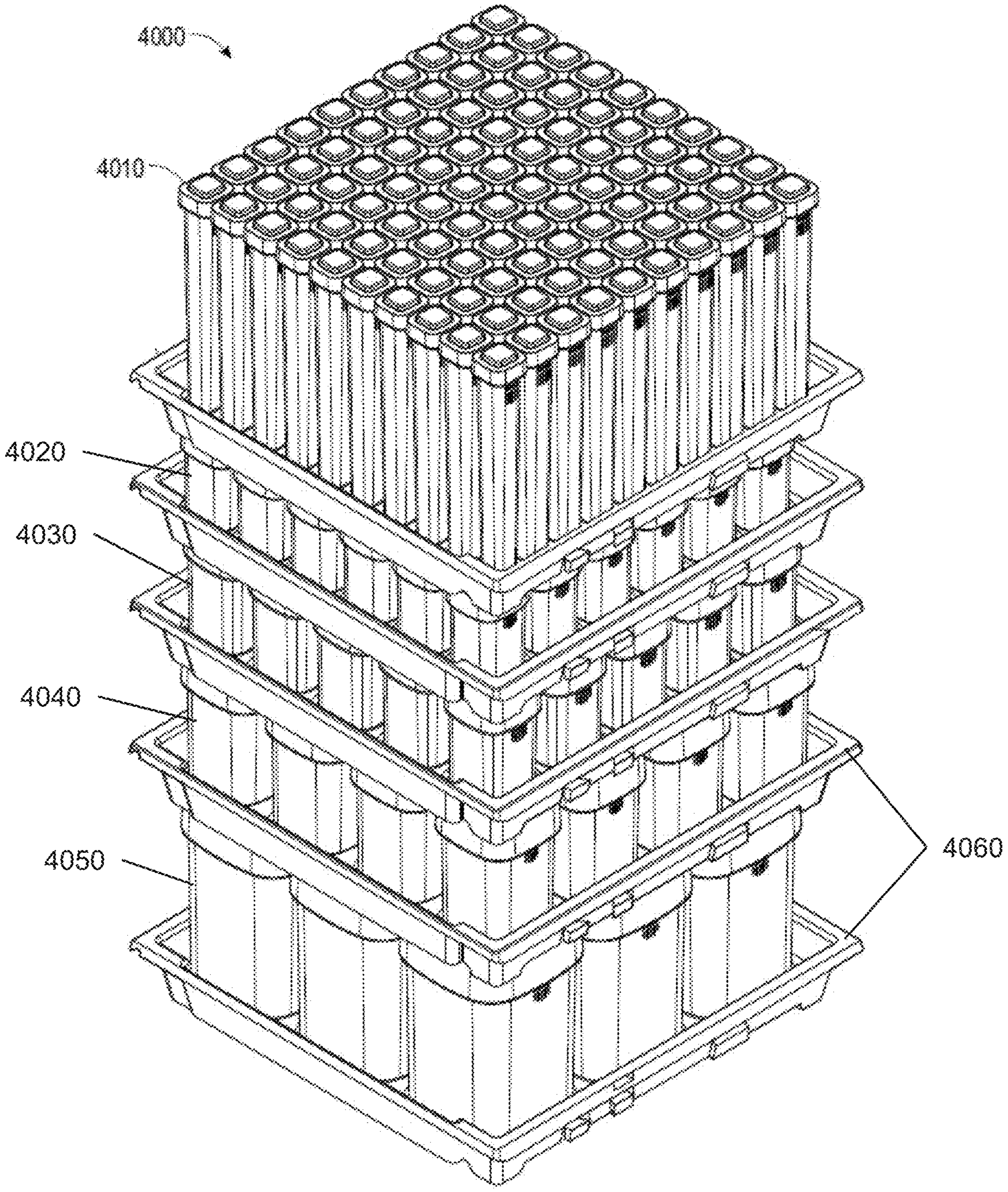
FIGS. 34A-34D illustrate various views of an embodiment of a stacked modular container system having 5 tray frames, each tray frame having a tray insert filled with embodiments of child-resistant containers.
Figure 34B:
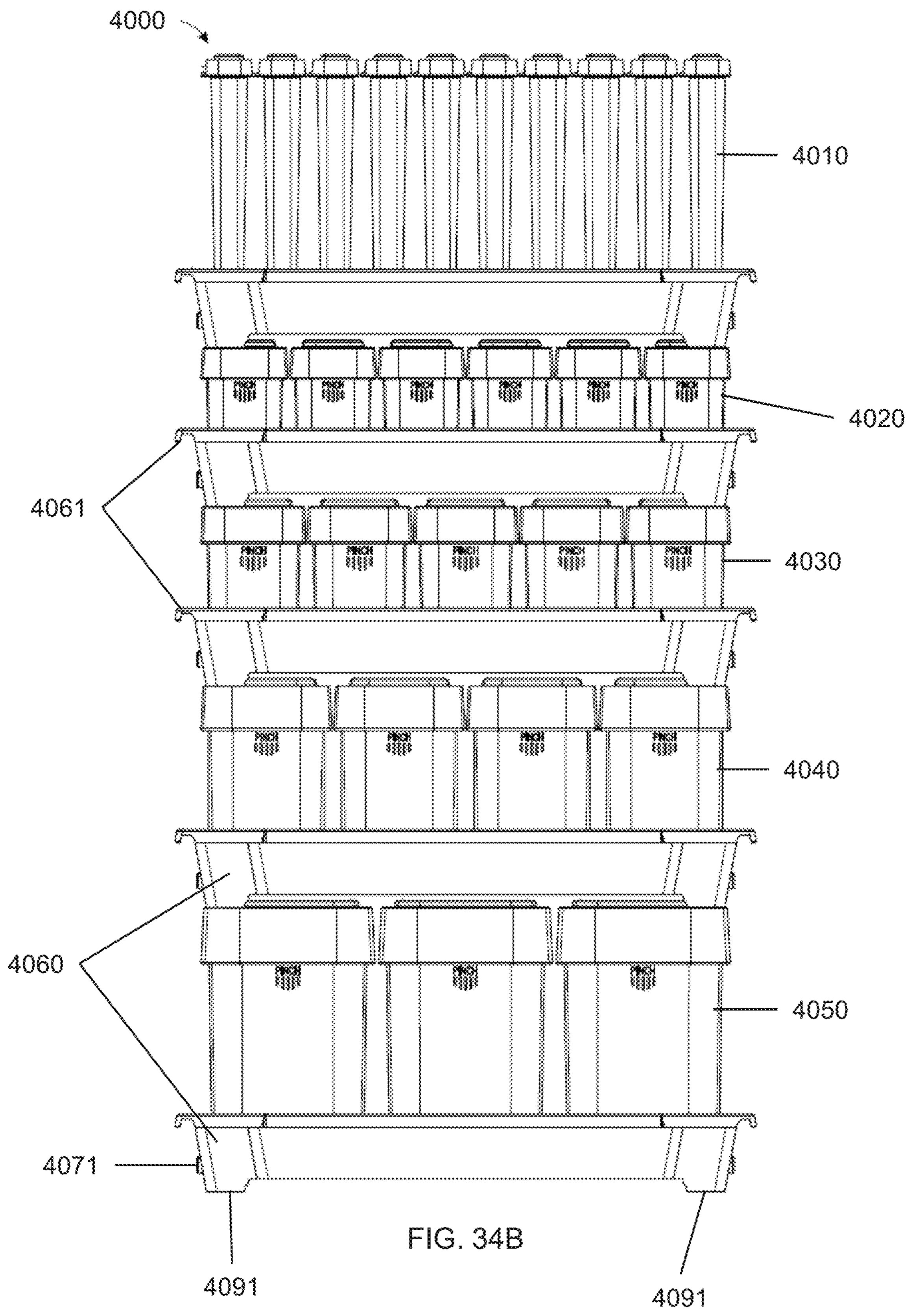
Figure 34C:
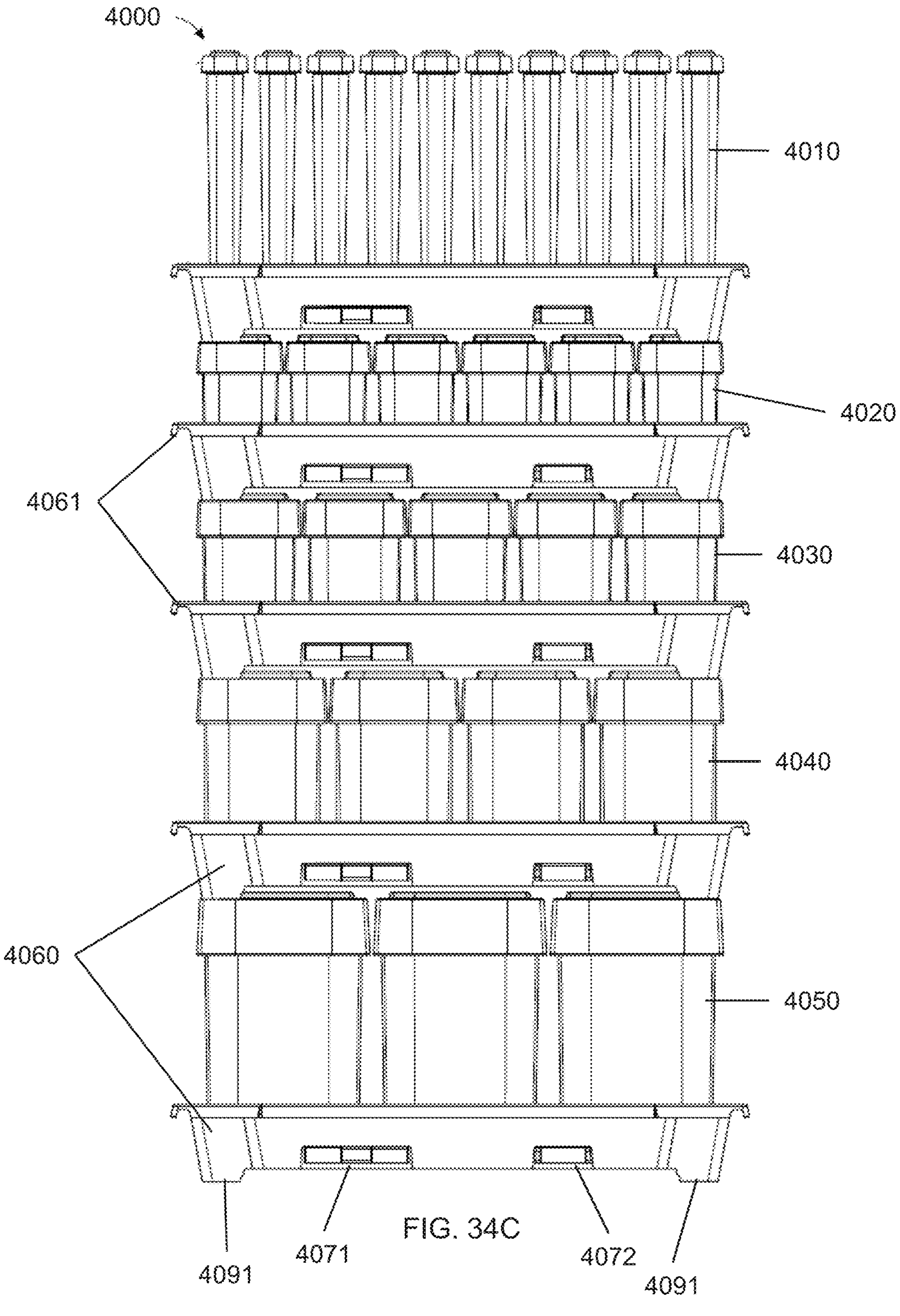
Figure 34D:
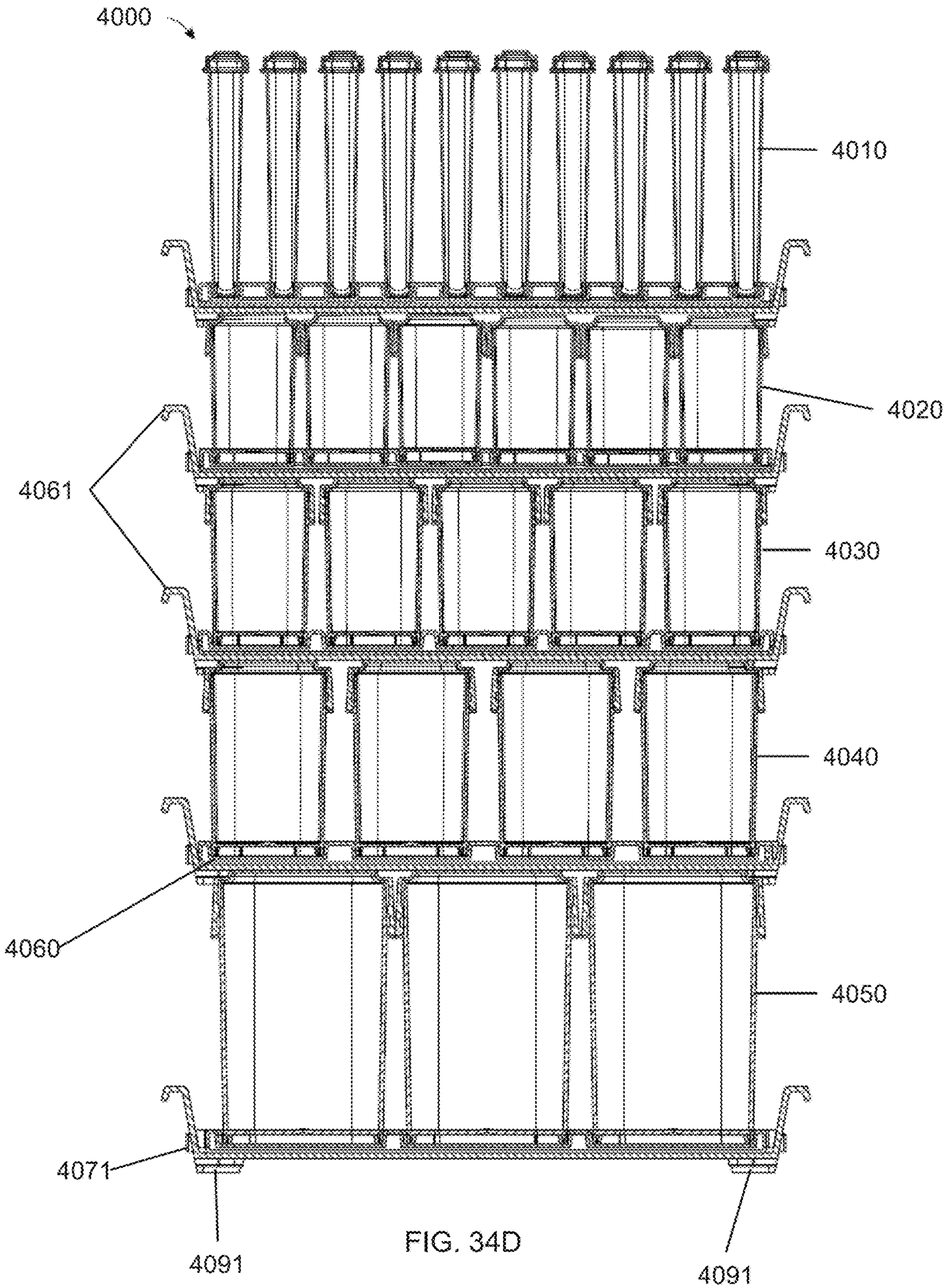

FIGS. 34A-34D illustrate various views of an embodiment of the modular container system. FIG. 34A is a perspective view of a stack of tray frames 4060, each having a tray insert and containers 4010, 4020, 4030, 4040 and 4050. The stacking or arrangement of the tray frame, tray insert and container subunits does not affect the system in any way and can be in any order. FIGS. 34B-34C show that the tray frame 4060 has lip 4061, which can be used for holding or carrying the tray frame. A portion of the tray frame locking mechanism 4071, 4072 abuts out from the tray frame. FIG. 34D is a cross-sectional view of the embodiment of the modular container system.

Methods of Making Modular Container Systems

The component described herein, including, but not limited to, the tray inserts, child-resistant containers, child-resistant tube containers, and the tray frames can be formed of plastic or any other suitable material. For example, any of the components of the modular container system can be a plastic, cardboard, recycled material, glass, metal, metal-alloy, combinations thereof, or other suitable materials. For example, suitable plastics include, but is not limited to, polypropylene, polypropylene copolymer, ultra-clarified polypropylene, colored polypropylene, PET, PETE fluorinated ethylene propylene, acrylonitrile butadiene styrene, polystyrene, high-impact polystyrene, polyvinyl chloride, or combinations thereof.

Other materials or additives can be added to any of the components (e.g., tray insert, child-resistant container, tray frame). For example, an antimicrobial additive can be added. Other additives can include as oxo-degradable additives, and biodegradable material substrate additives, UV resistance additives, and anti-static additives.

Parts of the modular container system, such as the container base and/or the container cap have an UV resistant or blocking material. The container base and/or the container cap are composed of a material having complete opacity. Complete opacity or an opaque material is described herein as exhibiting 100% opacity, wherein the material is light impermeable. In certain aspects the base or the cap or both are composed of a material having less than complete opacity. Such material may include characteristics having 80%, 70%, 60%, 50%, 40%, 30%, 20% 10% or 0% opacity, or any range in between. In certain embodiments, the container cap and/or base is completely opaque, and light protective. In some aspects the container cap and/or base is transparent, wherein the opacity is less than 100%. In some aspects the container cap and/or base is transparent, wherein the opacity about 10% or about approximately 0%.

In various aspects, part of the modular container system, such as the container cap and/or the container base, are protected by a removable sleeve. The removable sleeve can be opaque. The removable sleeve can be UV-resistant. In some aspects the removable sleeve is moisture resistant. In some aspects the removable sleeve is light impermeable. In some aspects the removable sleeve comprises surface markings for product identification, security notice or any combination thereof The plastic can be injection molded, thermoformed, vacuum formed, or manufactured in any way suitable to make the components described herein to achieve the desired functionality.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A modular container system, comprising:

a plurality of tray frames, the tray frames being stackable so as to nest with each other;

a plurality of tray inserts including at least a first tray insert; and a first quantity of child-resistant containers, each of the child-resistant containers having a container base and a container cap, wherein any one of the plurality of tray frames is sized and configured to receive any one of the plurality of tray inserts, wherein the first tray insert is sized and configured to receive the first quantity of child-resistant containers, wherein the first tray insert is configured to be received in a first tray frame of the plurality of tray frames, and wherein a second tray frame of the plurality of tray frames is configured to be stacked on the first quantity of child-resistant containers received in the first tray insert.

2. The modular container system of claim 1, wherein the first tray insert comprises a plurality of recessed portions, wherein each recessed portion is configured to receive a single child-resistant container.

3. The modular container system of claim 2, wherein each recessed portion of the plurality of recessed portions comprises an identifying mark.

4. The modular container system of claim 3, wherein the identifying mark is a number.

5. The modular container system of claim 4, wherein the plurality of recessed portions are sequentially numbered.

6. The modular container system of claim 2, wherein the first tray insert has 2, 4, 9, 16, 20, 25, 36, 40 or 100 recessed portions.

7. The modular container system of claim 6, wherein the first tray insert is configured to nest on top of another tray insert of the plurality of tray inserts.

8. The modular container system of claim 6, wherein the first tray insert is configured to be stacked on top of another tray insert of the plurality of tray inserts having a container in the recessed portions.

9. The modular container system of claim 1, wherein each of the plurality of tray inserts comprises a plastic.

10. The modular container system of claim 9, wherein the plastic is selected from the group consisting of polypropylene, fluorinated ethylene propylene, acrylonitrile butadiene styrene, polystyrene, high-impact polystyrene, or polyvinyl chloride.

11. The modular container system of claim 10, wherein the tray insert further comprises an antimicrobial additive.

12. The modular container system of claim 1, wherein the container cap comprises an annular sealing ring positioned on an inner surface of the container cap.

13. The modular container system of claim 1, wherein the first tray insert comprises a first locking mechanism disposed on a first side of the first tray insert and a second locking mechanism disposed on a second side of the first tray insert.

14. The modular container system of claim 13, wherein the first locking mechanism and the second locking mechanism each comprise a male connector and a female connector, so that the first tray insert is configured to reversibly connect with a second tray insert of the plurality of tray inserts.

15. The modular container system of claim 1, wherein each of the plurality of tray frames comprises a cardboard, a plastic, a glass, or a combination thereof.

16. The modular container system of claim 1, wherein at least one of the plurality of tray frames, the plurality of tray inserts, the first quantity of child-resistant containers, or a combination thereof further comprise a writing surface compatible with a pen, a pencil, or a marker.

17. The modular container system of claim 1, further comprising a second quantity of child-resistant containers, the first and second quantities being different.

18. The modular container system of claim 17, wherein the plurality of tray inserts includes a second tray insert configured to receive the second quantity of child-resistant containers, and the second tray insert is configured to be received in the second tray frame.

19. The modular container system of claim 18, further comprising a third tray frame of the plurality of tray frames, the third tray frame configured to be stacked on the second quantity of child-resistant containers received in the second tray insert.

* * * * *